US012811699B2

(12) United States Patent
Cabrol et al.

(10) Patent No.: US 12,811,699 B2

(45) Date of Patent: Nov. 24, 2026

(54) INDUCING BROADCAST CHANNEL IN RESONANCE MAGNETIC COUPLED COMMUNICATION SYSTEMS

(71) Applicant: DRNC HOLDINGS, INC., Wilmington, DE (US)

(72) Inventors: Patrick Cabrol, Bayshore, NY (US); Tanbir Haque, Jackson Heights, NY (US); Ravikumar Pragada, Warrington, PA (US); Hussain Elkotby, Conshohocken, PA (US)

(73) Assignee: DRNC Holdings, Inc., Wilmington, DE (US)

( * ) Notice: Subject to any disclaimer, the term of this patent is extended or adjusted under 35 U.S.C. 154(b) by 721 days.

(21) Appl. No.: 17/796,181

(22) PCT Filed: Jan. 29, 2021

(86) PCT No.: PCT/US2021/015631

§ 371 (c)(1),
(2) Date: Jul. 28, 2022

(87) PCT Pub. No.: WO2021/155101

PCT Pub. Date: Aug. 5, 2021

(65) Prior Publication Data

US 2023/0056412 A1 Feb. 23, 2023

Related U.S. Application Data

(60) Provisional application No. 63/051,644, filed on Jul. 14, 2020, provisional application No. 62/967,901, filed on Jan. 30, 2020.

(51) Int. Cl.

*H04B 17/327* (2015.01)
*H04B 5/26* (2024.01)

(Continued)

(52) U.S. Cl.

CPC ............. *H04B 17/327* (2015.01); *H04B 5/73* (2024.01); *H04B 5/266* (2024.01); *H04B 5/45* (2024.01)

(58) Field of Classification Search

CPC ........... H04B 5/72; H04B 5/73; H04B 17/327
See application file for complete search history.

(56) References Cited

U.S. PATENT DOCUMENTS 9,438,074 B2 9/2016 Lee et al.
9,609,536 B2 * 3/2017 Barbieri ............... H04B 17/318

(Continued)

FOREIGN PATENT DOCUMENTS

| | | |
|---|---|---|
| CN | 102769341 | 11/2012 |
| CN | 107749676 | 3/2018 |
| CN | 110708099 | 1/2020 |

OTHER PUBLICATIONS

Kurs et al., Wireless Power Transfer via Strongly Coupled Magnetic Resonances, American Association for the Advancement of Science (AAAS), ScienceMag, vol. 317, No. 5834, Jul. 6, 2007, 4 pages.

(Continued)

*Primary Examiner* — Yuwen Pan

(74) *Attorney, Agent, or Firm* — Mark D. Pratt

(57) ABSTRACT

A method implemented in a wireless transmit/receive unit (WTRU) for forming a broadcast channel in a resonance magnetic coupled communication system is provided. The method may include receiving a request from a plurality of devices to join the broadcast channel and transmitting a reference signal to the plurality of devices. The method may also include requesting a measurement of signal quality based on the reference signal from the plurality of devices and receiving the measurement of signal quality from the plurality of devices. Further it may include determining a frequency range for the broadcast channel based on the (Continued)

Determining Broadcast Channel measurement of signal quality and transmitting a configuration of the broadcast channel to the plurality of devices.

20 Claims, 41 Drawing Sheets

(51) Int. Cl.
*H04B 5/45* (2024.01)
*H04B 5/73* (2024.01)

(56) References Cited

U.S. PATENT DOCUMENTS 9,887,594 B2 2/2018 Kim et al.
9,894,593 B2 * 2/2018 Daragon ............... H04W 12/06
10,068,702 B2 * 9/2018 Posat .................... H01L 23/645
10,396,855 B2 * 8/2019 Rouaissia ................ H04B 5/72
10,931,332 B2 * 2/2021 Youn ........................ H02J 50/12
2013/0065522 A1 * 3/2013 Hwang ................. H04W 76/20
455/41.1
2013/0154387 A1 6/2013 Lee et al.
2013/0322276 A1 * 12/2013 Pelletier ................ H04W 24/10
370/252
2014/0070625 A1 3/2014 Kim et al.
2015/0171925 A1 * 6/2015 Ling ........................ H04B 5/26
455/41.1
2016/0301242 A1 10/2016 Kim et al.
2017/0093170 A1 3/2017 Saunamaki
2022/0038136 A1 2/2022 Cabrol et al.

OTHER PUBLICATIONS

Karalis et al., Efficient Wireless Non-Radiative Mid-Range Energy Transfer, Annals of Physics, vol. 323, No. 1, Jan. 2008, 19 pages.
Sample et al., Analysis, Experimental Results, and Range Adaptation of Magnetically Coupled Resonators for Wireless Power Transfer, Institute of Electrical and Electronics Engineers (IEEE), IEEE Transactions on Industrial Electronics, vol. 58, Issue No. 2, Feb. 2011, 11 pages.

* cited by examiner

Resonance Magnetic Frequency Response versus Distance

Resonance Magnetic Power Transfer Circuit Model

Cluster Head Selection

- A Sends LAB to C
- A Sends LAC to B
- B Sends LBC to A

- A, B, C Update Own Table of Ranks
- Cluster Head Selected (Ex: A)

(d)

FIG. 7D

A (CL) Determines Common Channel Using LAB and LAC to Send Commands and Requests to Devices B and C (e)

FIG. 7E

Tx Data Format from Node to CLH

Determining Broadcast Channel

14

INDUCING BROADCAST CHANNEL IN RESONANCE MAGNETIC COUPLED COMMUNICATION SYSTEMS

CROSS REFERENCE TO RELATED APPLICATIONS

This application is the U.S. National Stage, under 35 U.S.C. § 371, of International Application No. PCT/US2021/015631 filed Jan. 29, 2021, which claims the benefit of U.S. Provisional Application No. 62/967,901 filed Jan. 30, 2020 and U.S. Provisional Application No. 63/051,644 filed Jul. 14, 2020, which is incorporated by reference as if fully set forth.

BACKGROUND

Wireless power transfer (WPT), as a result of the fairly recent universal adoption of portable electronic devices, has attracted considerable attention in many commercial applications including smartphones, medical instruments, electric vehicles (EVs), wireless sensors and other IoT devices.

SUMMARY

A method implemented in a wireless transmit/receive (WTRU) for forming a broadcast channel in a resonance magnetic coupled communication system is provided. The method may include receiving a request from a plurality of devices to join the broadcast channel and transmitting a reference signal to the plurality of devices. The method may also include requesting a measurement of signal quality based on the reference signal from the plurality of devices and receiving the measurement of signal quality from the plurality of devices. Further it may include determining a frequency range for the broadcast channel based on the measurement of signal quality and transmitting a configuration of the broadcast channel to the plurality of devices.

A wireless transmit/receive unit (WTRU) configured to communicate via a resonance magnetic communication link is provided. The WTRU may include an antenna having a loop coupled to a multi-turn spiral coil and a processor communicatively coupled to the antenna and configured to receive a request from a plurality of devices to join a broadcast channel. The processor may also be configured to transmit a reference signal to the plurality of devices; request a measurement of signal quality based on the reference signal from the plurality of devices; and receive the measurement of signal quality from the plurality of devices. The processor may further be configured to determine a frequency range for the broadcast channel based on the measurement of signal quality and to transmit a configuration of the broadcast channel to the plurality of devices. It may also be configured to, on a condition that the WTRU receives an announcement from a device of the plurality of devices indicating a departure of the device from a group communicating on the broadcast channel or that the WTRU detects a decrease in signal quality from at least one device from the plurality of devices, adjusting the configuration of the broadcast channel and requesting a subset of the plurality of devices to adjust their respective loop-to-coil coefficients.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIGS. 7A-7G are block diagrams illustrating example cluster head selection;

FIG. 18AA is an enlargement of aspects of FIG. 18A;

FIG. 18AB is an enlargement of aspects of FIG. 18A;

FIG. 18BA is an enlargement of aspects of FIG. 18B;

FIG. 18BB is an enlargement of aspects of FIG. 18B;

FIG. 18CA is an enlargement of aspects of FIG. 18C;

FIG. 18CB is an enlargement of aspects of FIG. 18C;

DETAILED DESCRIPTION OF THE PREFERRED EMBODIMENTS

Figure 1A:
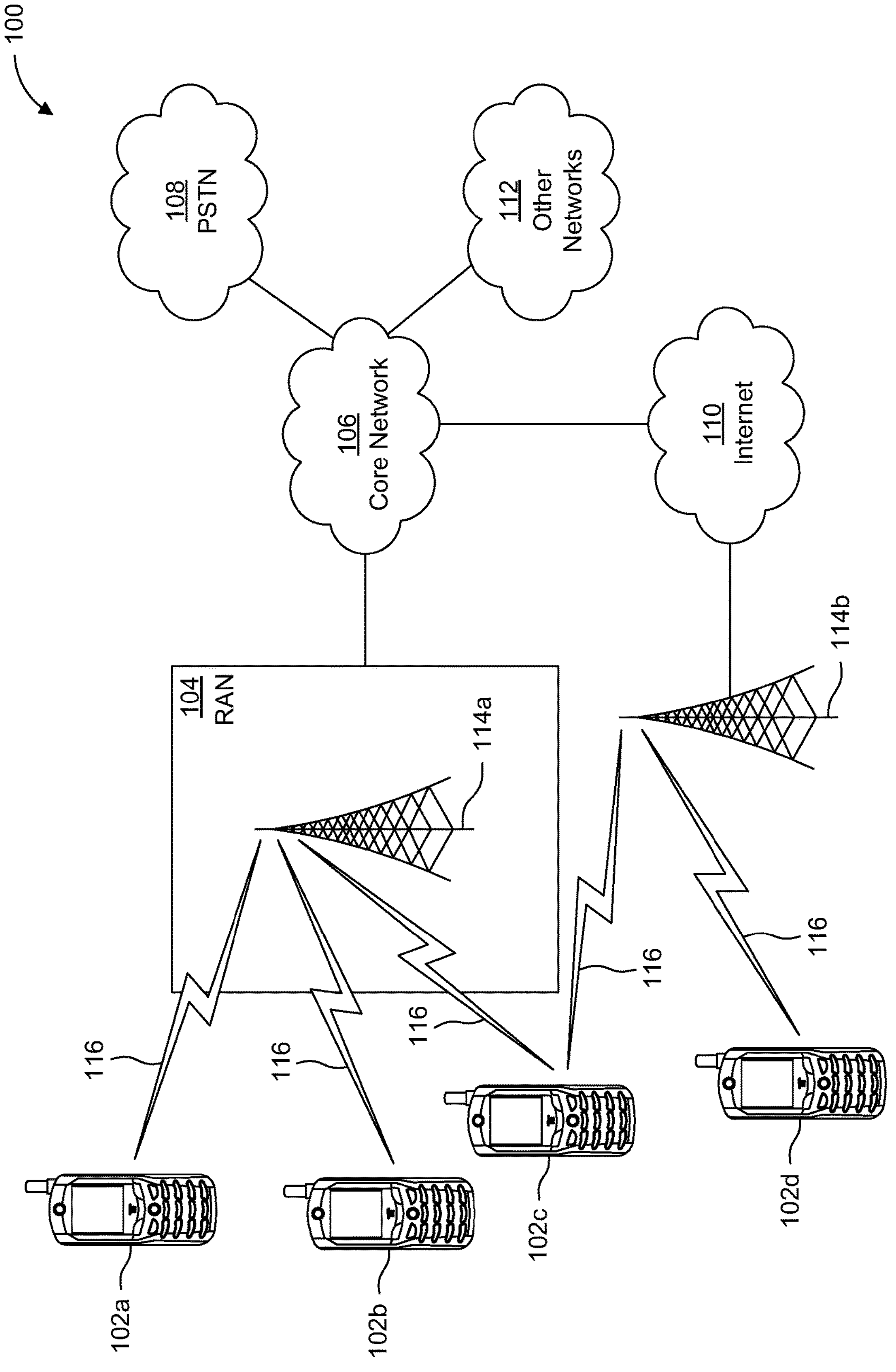
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
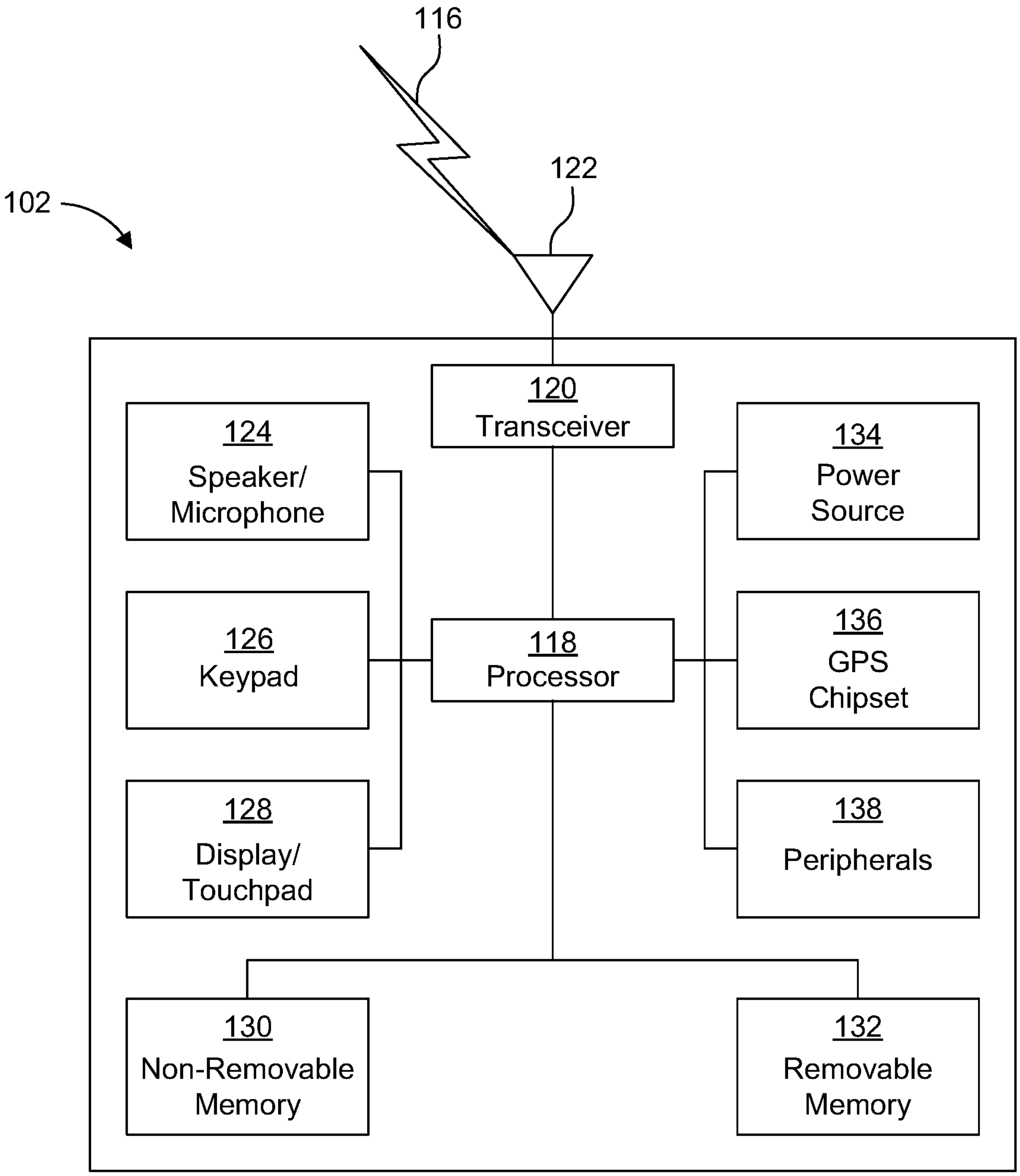
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
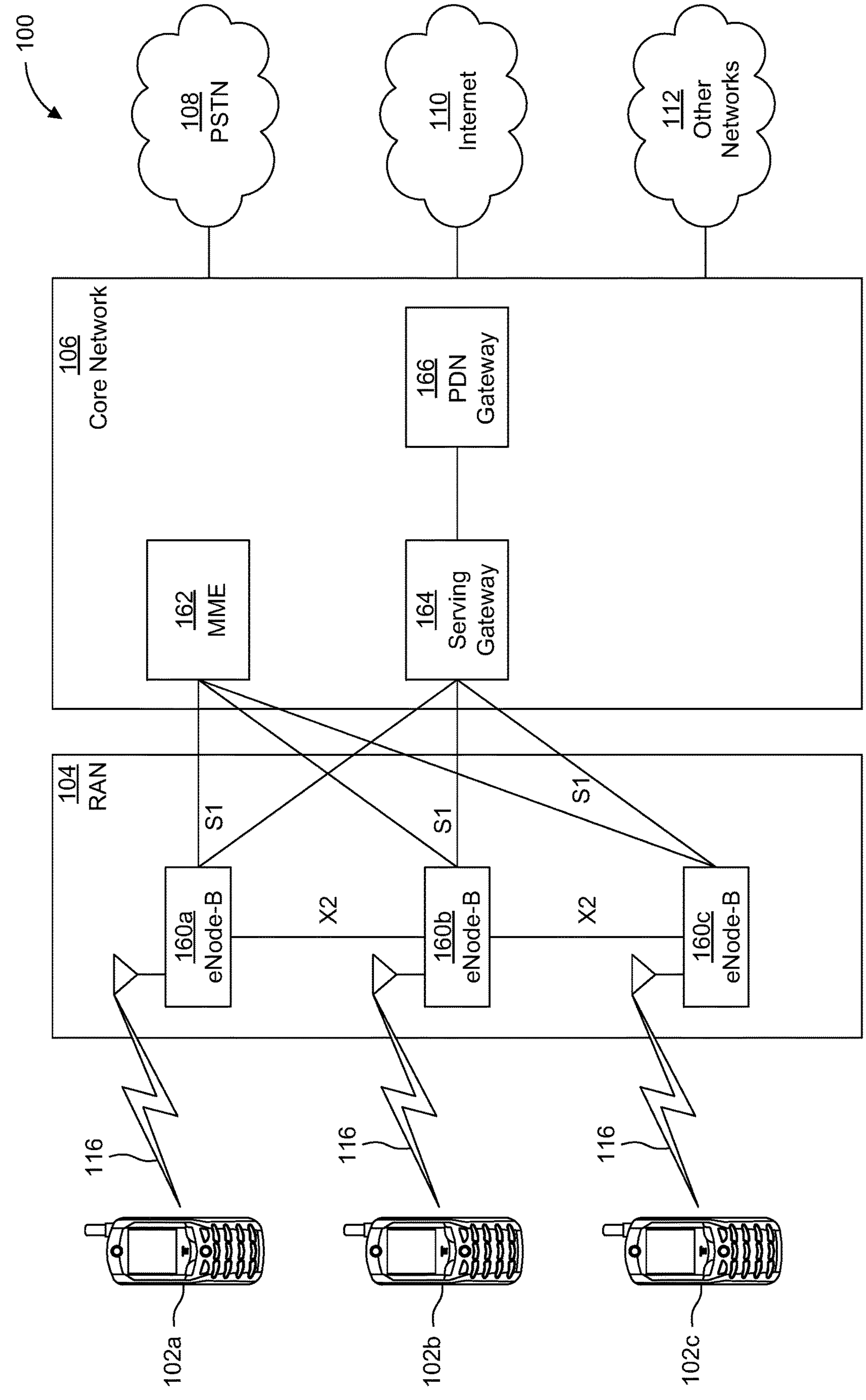
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
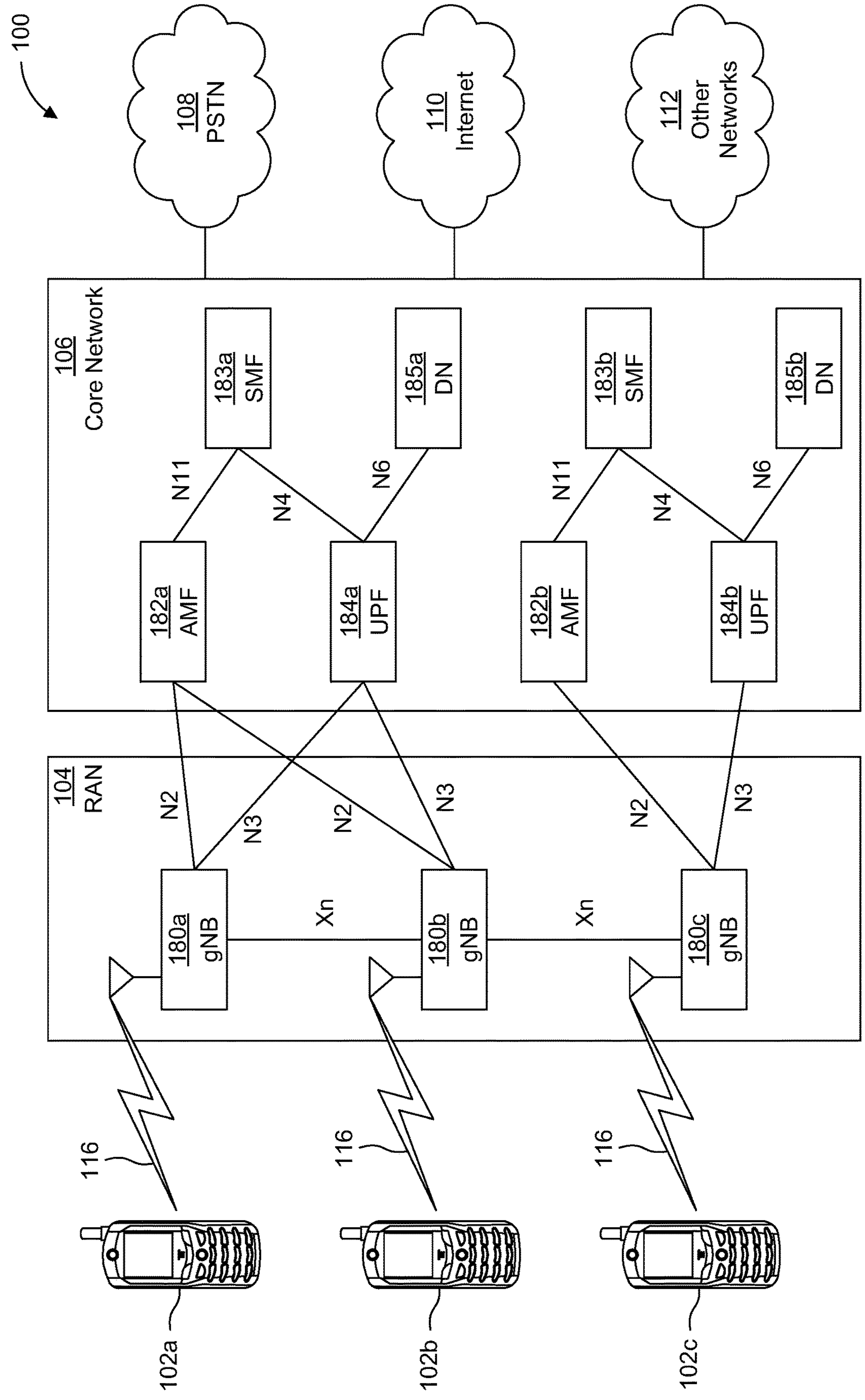
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Some implementations provide a method implemented in a wireless transmit/receive unit for forming a broadcast channel in a resonance magnetic coupled communication system. A request is received from a plurality of devices to join the broadcast channel. A reference signal is transmitted to the plurality of devices. A signal-to-noise ratio (SNR) level measurement based on the reference signal is requested from the plurality of devices. SNR contours are received from the plurality of devices. Broadcast group membership is determined based on the received SNR contours. A frequency range for the broadcast channel is determined based on the SNR contours. Each of the plurality of devices is requested to adjust its loop-to-coil coefficients to maximize SNR level. New SNR levels are requested from the plurality of devices. A configuration of the broadcast channel is transmitted to the plurality of devices. Alternatively, RSSI measurements may be substituted for SNR. If the noise floor is known, they may be equivalent measurements.

Some implementations provide a method implemented in a wireless transmit/receive unit for determining group membership for a broadcast channel in a resonance magnetic coupled communication system. Signal-to-noise ratio (SNR) reports are received from a plurality of devices; A frequency range for the broadcast channel is determined based on the SNR reports; A membership list is created of devices, from the plurality of devices, which report SNR above a threshold; All devices, from the plurality of devices, reporting SNR below the threshold, are excluded; and a current broadcast channel configuration and membership status are transmitted to the plurality of devices. In some implementations, broadcast channel quality of the plurality of devices is monitored. If all SNRs are not greater than the threshold, channel quality is adapted by changing coupling coefficients. An updated broadcast channel configuration is transmitted.

Some implementations provide a method implemented in a wireless transmit/receive unit for adding another device to a broadcast channel in a resonance magnetic coupled communication system. A current broadcast channel configuration is transmitted to the device and a signal-to-noise ratio (SNR) measurement is received from the device. A broadcast channel frequency is determined based on the SNR measurement. If the SNR is not greater than a threshold, a broadcast center frequency is changed by a predetermined frequency increment (df) used when searching for an optimal broadcast channel to accommodate the device, broadcast channel membership is declined to the device if the new center frequency (fc) has not changed by less than fmax, and a new common channel frequency response (Fcom) configuration is transmitted to all devices. Coupling coefficients are updated if the fc has changed by less than a maximum deviation (fmax) from the original fc. Loop-to-coil coupling coefficients are optimized.

Some implementations provide a WTRU, network device, computing device, integrated circuit, eNB, gNB, BS, and/or AP configured to implement one or more of these methods. Some implementations provide a non-transitory computer readable medium including instructions which when executed by a processing device cause the processing device to perform one or more of these methods.

The following abbreviations and acronyms, among others, are used herein:

AP Access Point
AWGN Additive white Gaussian noise
CH Channel
CN Core Network (e.g. LTE packet core)
DL Downlink
eNB E-UTRAN Node B
FDD Frequency Division Duplexing
FDM Frequency Division Multiplexing
LTE Long Term Evolution e.g. from 3GPP LTE R8 and up
MAC Medium Access Control
OFDM Orthogonal Frequency-Division Multiplexing
PHY Physical Layer
PSM Power Save Mode
RAT Radio Access Technology
RF Radio Front end
RSSI Received Signal Strength Indicator
SNR Signal-to-Noise Ratio
STA Station
TDD Time-Division Duplexing
TDM Time-Division Multiplexing
TRX Transceiver
UE User Equipment
UL Uplink
Uu Interface between the eNodeB amd the UE
WLAN Wireless Local Area Networks and related technologies
WTRU Wireless Transmit/Receive Unit Wireless power transfer (WPT), as a result of the fairly recent universal adoption of portable electronic devices, has attracted considerable attention in many commercial applications including smartphones, medical instruments, electric vehicles (EVs), wireless sensors and other IoT devices.

Conventional radiative energy transfer, used mainly for transferring information, poses some difficulties for power transfer applications. Such difficulties may include low efficiency of power transfer for omnidirectional radiation patterns, and unidirectional radiation requiring line-of-sight and special tracking mechanisms to accommodate mobility.

Power delivery may be demonstrated at mid-field with higher efficiency than far-field approaches, and at longer distances than traditional inductive coupled systems. Fixed distance and orientation limitations may be overcome, where efficiency would fall-off rapidly when the receiving device is relocated away from its optimal operating coordinates.

It is feasible to use resonant objects coupled through their non-radiative fields for mid-range energy transfer. Two resonant objects tuned at the same resonant frequency tend to exchange energy efficiently. In addition, since most common materials do not interact with magnetic fields, magnetic resonance systems are particularly suitable for everyday applications. If multiple devices come within range of each other, there may arise a need to coordinate their interaction and minimize cross-interference.

In LTE and other cellular systems, a Common Control Channel (CCCH) may be responsible for transferring control information between all mobiles and the BTS. This may be necessary for the implementation of "call origination" and "call paging" functions.

A Physical Broadcast Channel (PBCH) may carry system information for WTRUs attempting to access the network. The group of Broadcast Channel (BCH) may include three channels (UMTS): Broadcast Control Channel (BCCH), Frequency Correction Channel (FCCH) and Synchronization Channel (SCH). A Cell Broadcast Channel (CBCH) may be used to transmit messages to be broadcast to all MS's within a cell. A MS may then move to a dedicated channel in order to proceed with either a call setup, response to a paging message, Location Area Update or Short Message Service.

A Medium Access Control (MAC) layer may control the higher layers' access to the PHY layer. The MAC layer may be connected to the PHY layer below through transport channels, and to the RLC layer above through logical channels. The MAC layer may decide which logical channels can access the transport channels at a given time and performs multiplexing and de-multiplexing of the data between them. The MAC layer may provide a radio resource allocation service and data transfer service to the upper layer such as the network layer through the Radio Link Control (RLC) layer and the Packet Data Convergence Control (PDCP) layer in an LTE like system, for example.

Figure 2:
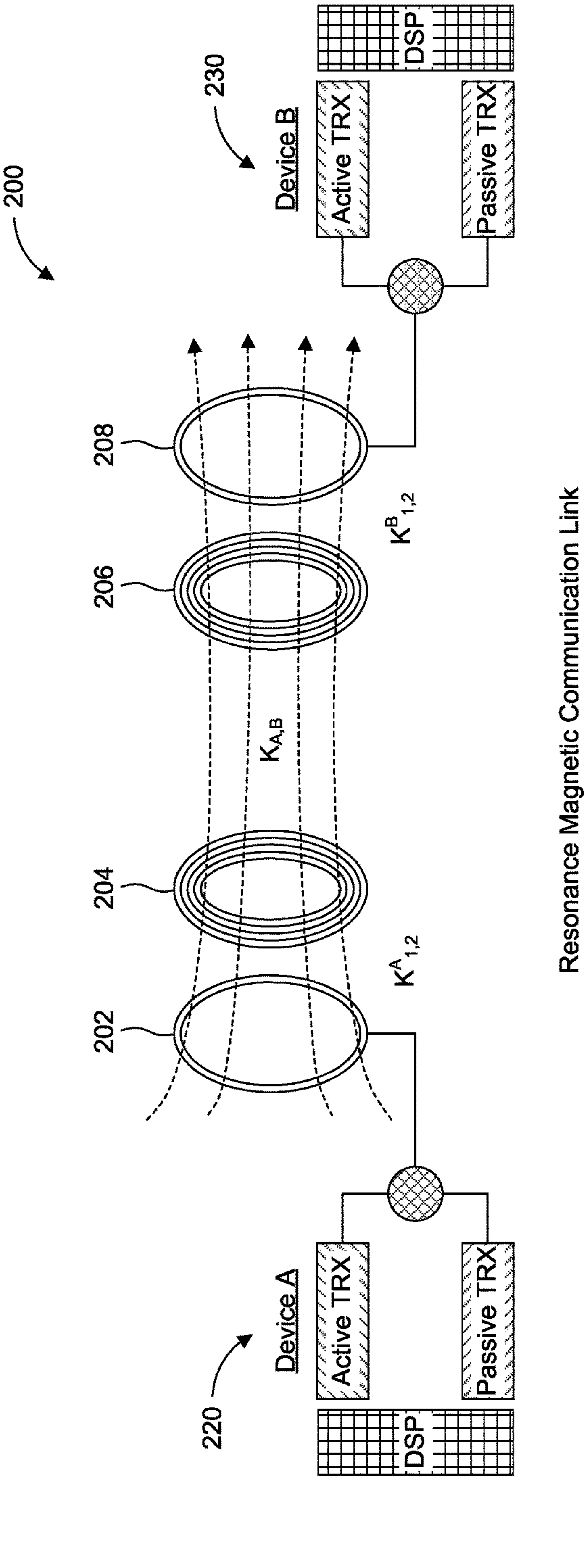
FIG. 2 is a schematic diagram of a resonance magnetic communication link.

A schematic diagram of a resonance magnetic WPT and communications system 200 is shown in FIG. 2. The schematic diagram of FIG. 2 illustrates a resonance magnetic communication link between a device A 220 and a device B 230. A single turn drive loop 202 is coupled to a multi-turn spiral coil 204 to make up the transmit antenna. If the transmitter (TRX) amplifier powers the drive loop 202, a resulting oscillating magnetic field excites the transmission (Tx) coil 204, which stores energy in the same manner as a discrete LC tank (i.e., inductor-capacitor resonant circuit). The reception (Rx) side functions in a similar manner with an Rx coil 206 and a load loop 208. An interaction occurs between the two coils (i.e., Tx coil 204 and Rx coil 206), each of which is a high-Q RLC tank resonator (i.e., a resistor-inductor-capacitor resonant circuit with a relatively high Q factor). Similar to the way in which the loop and coil are magnetically coupled, the transmit and receive coils share a mutual inductance which is a function of the geometry of the coils and the distance between them.

If the wireless power system is driven with an RF source and using a load resistor on the receiver to extract work from the system, the amount of coupling defines how much energy is transferred per cycle. This means that there is a distance (called the critical coupling point) beyond which the system can no longer drive a given load at maximum efficiency. Presented herein are an analytic model of the magnetically coupled resonator system, derivations of system parameters and figures of merit, and a description of adaptive tuning techniques used to achieve near constant efficiency vs. distance.

Figure 3:
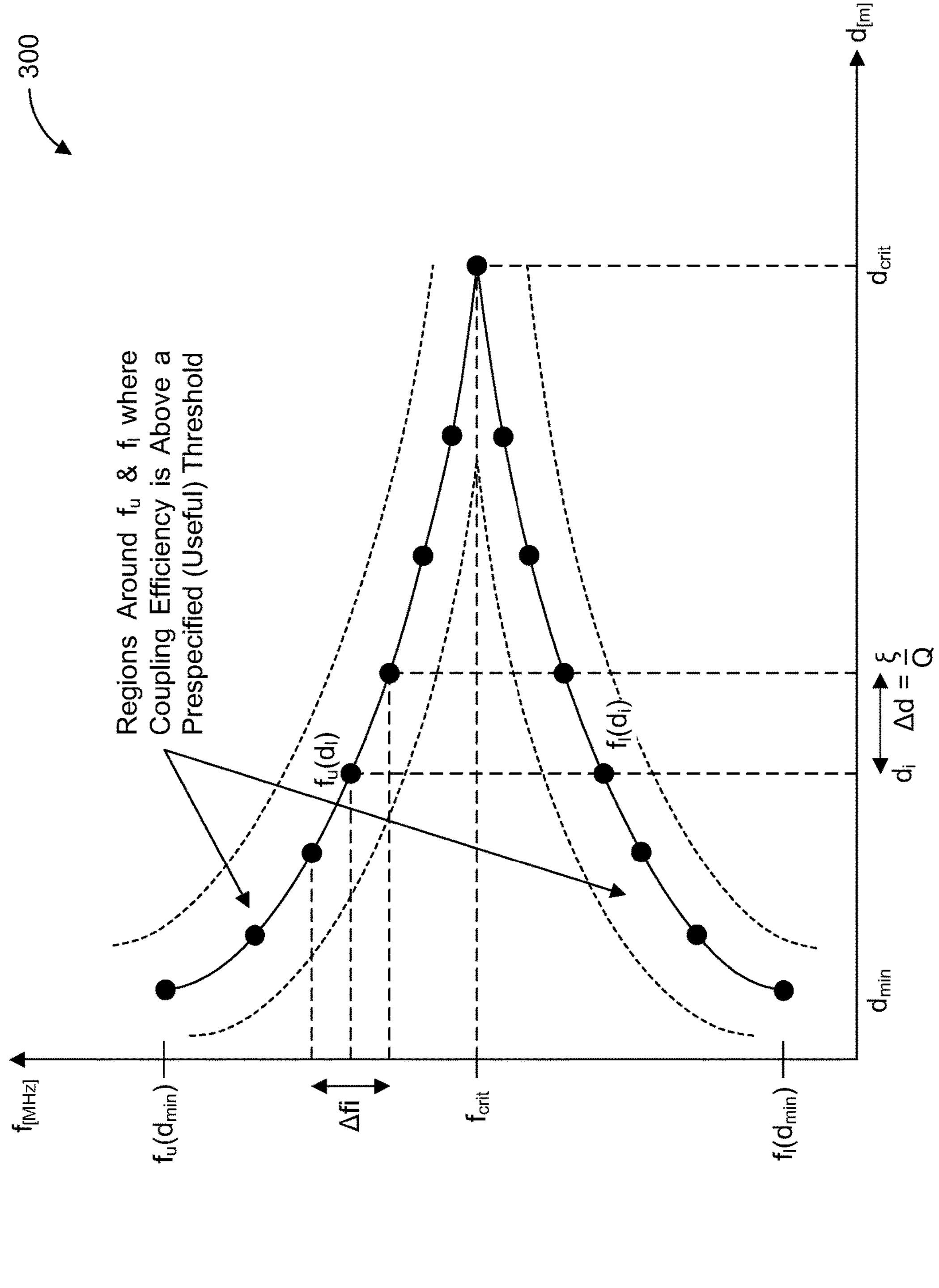
FIG. 3 is a graph illustrating resonance magnetic frequency response versus distance.
Figure 4:
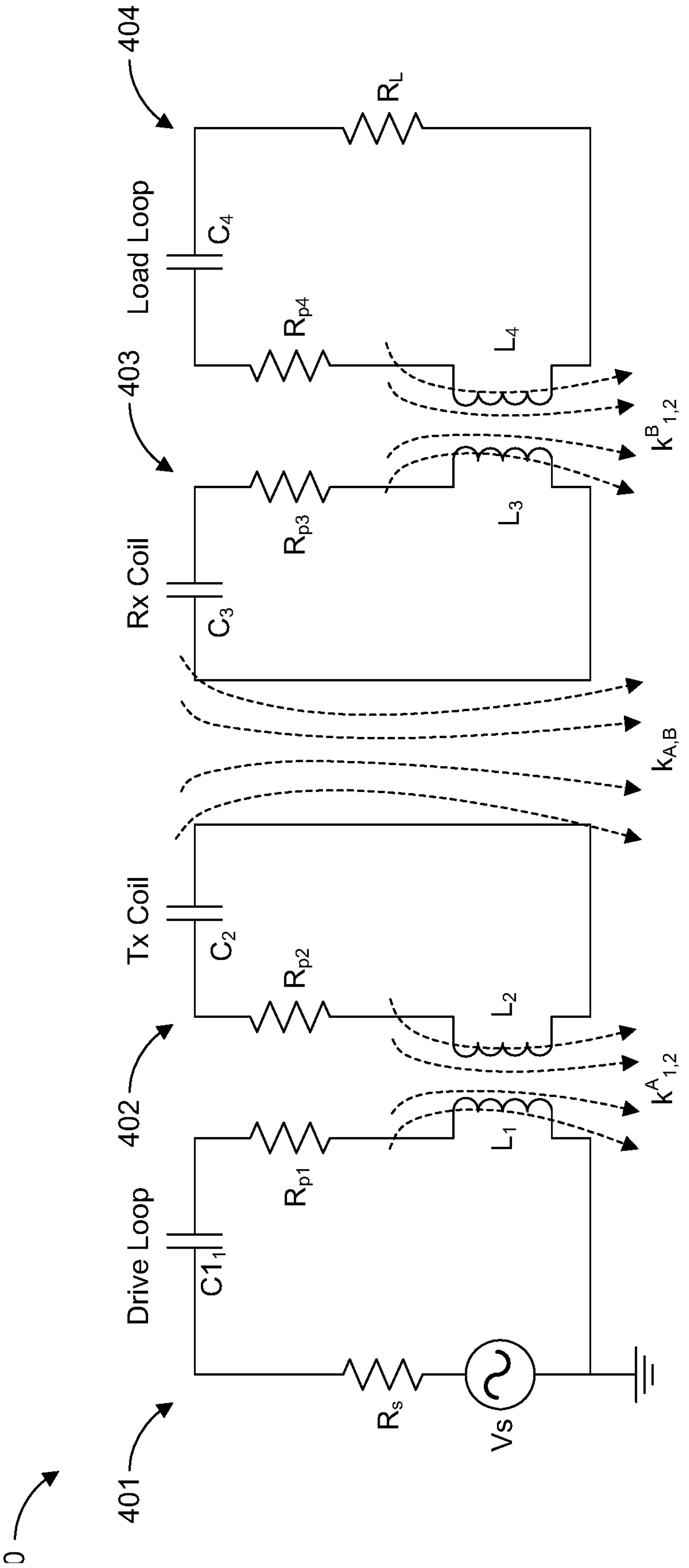
FIG. 4 is a schematic diagram illustrating a resonance magnetic power transfer circuit model.

FIG. 3 shows a graph 300 illustrating resonance magnetic frequency response versus distance. FIG. 4 is a schematic diagram illustrating a resonance magnetic power transfer circuit model 400, which includes a drive loop resonant circuit 401, a transmission coil resonant circuit 402, a reception coil resonant circuit 403, and a load loop resonant circuit 404.

Electric circuit theory (ECT) may be used to design and analyze WPT systems. For example, for the resonant magnetic (RM) system 400 illustrated by resonant magnetic circuit model shown in FIG. 4, the current in each resonant circuit is determined using Kirchhoff's voltage law, as shown in equations 1-4, where M indicates mutual coupling between the subscripted ports and jω is the frequency in radians per second phase shifted by 90 degrees (quadrature):

$$I_1\left(R_S + R_{p1} + j\omega L_1 + \frac{1}{j\omega C_1}\right) + j\omega I_2 M_{12} = V_s \qquad \text{Equation 1}$$

$$I_2\left(R_{p2} + j\omega L_2 + \frac{1}{j\omega C_2}\right) + j\omega(I_1 M_{12} - I_3 M_{23}) = 0 \qquad \text{Equation 2}$$

$$I_3\left(R_{p3} + j\omega L_3 + \frac{1}{j\omega C_3}\right) + j\omega(I_4 M_{34} - I_2 M_{23}) = 0 \qquad \text{Equation 3}$$

$$I_4\left(R_L + R_{p4} + j\omega L_4 + \frac{1}{j\omega C_4}\right) + j\omega I_3 M_{34} = 0 \qquad \text{Equation 4}$$

The coupling coefficient is defined as:

$$k_{xy} = \frac{M_{xy}}{\sqrt{L_x L_y}},\ 0 \le k_{xy} \le 1 \qquad \text{Equation 5}$$

After solving these four Kirchhoff's Voltage Law (KVL) equations for the voltage $V_L$ across the load resistor we have:

$$\frac{V_L}{V_S} = \frac{j\omega^3 k_{12}k_{23}k_{34}L_2L_3\sqrt{L_1L_4}\,R_l}{\left(k_{12}^2k_{34}^2L_1L_2L_3L_4\omega^4 + Z_1Z_2Z_3Z_4 + \omega^2\left(k_{12}^2L_1L_2Z_3Z_4 + k_{23}^2L_2L_3Z_1Z_4 + k_{34}^2L_3L_4Z_1Z_2\right)\right)} \qquad \text{Eq. 6}$$

Using the following substitutions:

$$Z_1 = R_{p1} + R_s + j\omega L_1 - \frac{1}{j\omega C_1} \qquad \text{Equation 7}$$

$$Z_2 = R_{p2} + j\omega L_2 - \frac{1}{j\omega C_2} \qquad \text{Equation 8}$$

$$Z_3 = R_{p3} + j\omega L_3 - \frac{1}{j\omega C_3} \qquad \text{Equation 9}$$

$$Z_4 = R_{p4} + R_L + j\omega L_4 - \frac{1}{j\omega C_4} \qquad \text{Equation 10}$$

where Z is a complex impedance which substitutes for the expressions in Equations 1~4 (a complex conjugate of the expression), the equivalent $S_{21}$ scattering parameter can be calculated, which results in equation 11:

$$S_{21} = 2\frac{V_L}{V_S}\left(\frac{R_S}{R_L}\right)^{1/2} \quad \text{Equation 11}$$

The RM system 400 modeled in FIG. 4 uses lumped circuit elements to describe the RM system. It shows four circuits 401-404 magnetically coupled as represented by coefficients $k_{12}^A$, $k_{AB}$, $k_{12}^B$. The drive loop 401, on the left side, is excited by a source with output impedance $R_s$, a single turn drive loop modeled as inductor $L_1$, with parasitic resistance $R_{p1}$. Capacitor, $C_1$, along with $L_1$, set the drive loop resonance frequency.

The transmit coil 402 includes a multi-turn spiral inductor ($L_2$), with parasitic resistance ($R_{p2}$) and self-capacitance $C_2$. Inductors $L_1$ and $L_2$ are linked with coupling coefficient $k_{12}^A$. The receiver side shares a similar topology respectively in load loop 404 and reception coil 403. The transmitter and receiver coils are linked by coupling coefficient, $k_{AB}$. In a typical implementation of the system, $k_{AB}$ varies as a function of the distances between the transmitter to receiver.

Critical coupling and system parameters are derivable, for example, as follows. First in this example, the equation of critical coupling is derived by substituting the term for series quality factor and resonant frequency, shown in equations 12 and 13, into the transfer function:

$$Q_i = \frac{1}{R_i}\sqrt{\frac{L_i}{C_i}} = \frac{\omega_i L_i}{R_i} = \frac{1}{\omega_i R_i C_i} \quad \text{Equation 12}$$

$$\omega_i = \frac{1}{\sqrt{L_i C_i}} \quad \text{Equation 13}$$

The voltage gain at the center frequency $\omega_0$ is presented in equation 14:

$$\left(\frac{V_L}{V_s}\right)\Big|_{\omega=\omega_0} = \frac{ik_{cc}k_{12}^2 Q_{coil}^2 Q_{loop}^2}{k_{cc}^2 Q_{coil}^2 + \left(1 + k_{12}^2 Q_{coil} Q_{loop}\right)^2} \quad \text{Equation 14}$$

Solving for $k_{cc}$, notation for the symmetric coil-to-coil coupling ($k_{AB}$ and $k_{BA}$), yields:

$$k_{crit} = \frac{1}{Q_{coil}} + k_{12}^2 Q_{loop} \quad \text{Equation 15}$$

At the critical coupling point:

$$|S_{21}|_{crit} = \frac{k_{12}^2 Q_{coil} Q_{loop}}{1 + k_{12}^2 Q_{coil} Q_{loop}} = \frac{k_{12}^2 Q_{loop}}{k_{crit}} \quad \text{Equation 16}$$

Reducing $k_{12}$, the loop-to-coil coupling, lowers $k_{crit}$ and therefore increases range. However, according to equation 16, reducing $k_{12}$ also reduces efficiency.

In some implementations, radiative far-field communication systems are not impacted by the number, location, and orientation of devices; but mid-field resonance magnetic coupling (RMC) channels, in addition to their dependency on all of the above, are also dependent on the load termination at the devices. In some implementations, as the number of devices that are introduced within a given RMC range increases, the total power coupled into the midfield by a transmitter is divided amongst the receiving devices. In some implementations, the amount of energy coupled to a receiver is proportional to its coupling factor and inversely proportional to the number of receiving devices in range. Any remaining power, not absorbed by a load, will remain available in the magnetic field emanating from the transmitting source. In some implementations, resonance magnetic coupling facilitates mid-field Wireless Power Transfer (WPT). In some implementations, mobility is supported within the midfield range at the cost of adjusting tank circuits resonance frequency to compensate for changes in location and orientation of the magnetically coupled devices.

In some implementations, device discovery may be enabled within the RMC framework and to establish device-to-device communication. In some implementations, multiple device pairs communicate within the same RMC range, and may cause potential interference to adjacent device pairs. Accordingly, it may be desired for multiple devices to broadcast information over a common channel, e.g., to better share radio resources and minimize interference to adjacent communication links.

Accordingly, some implementations determine a broadcast channel whose characteristics are subject to the location and orientation of all devices within RMC range. Some implementations determine if a new device appearing within range can be added on the Broadcast channel. Some implementations adapt the broadcast channel in the presence of new devices appearing within range.

Figure 5:
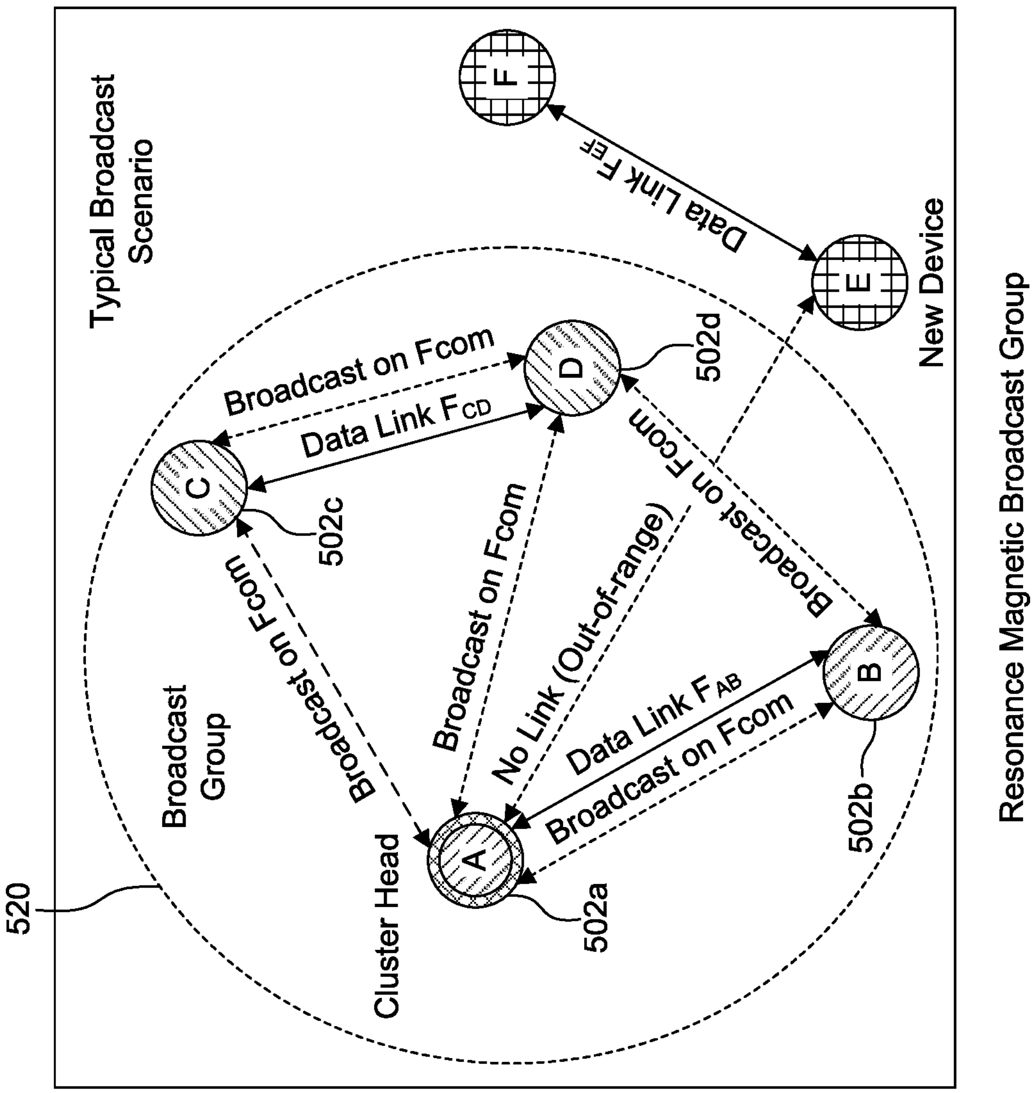
FIG. 5 is a block diagram illustrating an example resonance magnetic broadcast group scenario.

FIG. 5 is a block diagram illustrating an example resonance magnetic broadcast group scenario. In some implementations, a WTRU 502*a* selects a broadcast or groupcast CH for multiple devices within RMC range, selecting group 520 members 502*b*, 502*c*, 502*d* and adapting the link to variations in channel quality. In some implementations, the WTRU selects the broadcast or groupcast CH for multiple devices based on cluster formation in a centralized framework. In some implementations, if multiple devices need to share a resource or a channel efficiently, a set of rules is implemented for orderly access to the medium and to avoid, minimize, or reduce interference, contention, variations in channel quality, and other issues.

Figure 6:
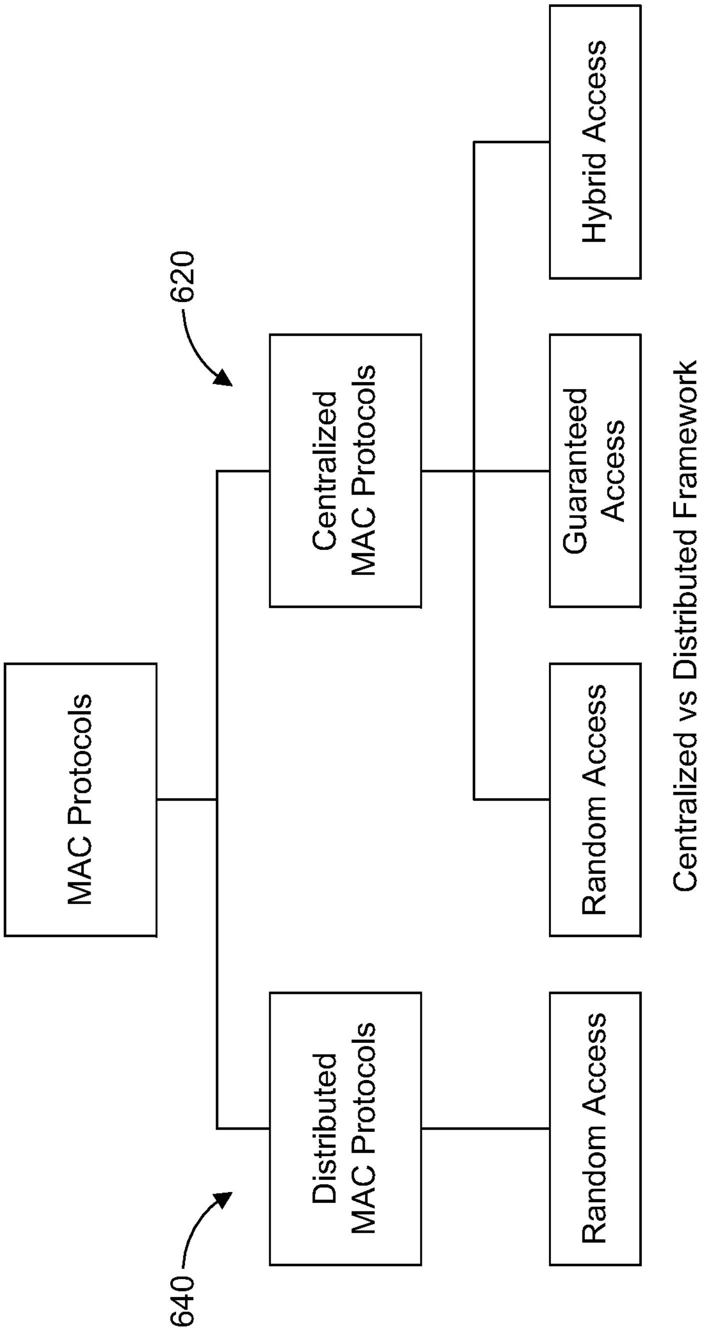
FIG. 6 is a tree diagram illustrating an example comparison of centralized versus distributed MAC protocol frameworks.

FIG. 6 is a tree diagram illustrating an example comparison of centralized versus distributed MAC protocol frameworks. As illustrated in FIG. 6, two main frameworks are typically considered to moderate this medium access: a centralized framework 620, and a distributed framework 640. Distributed wireless networks such as packet radio or ad hoc networks have no central controller (IEEE 802.11, ALOHA, CSMA/CD). Centralized wireless networks, infrastructure mode in WLANS, cellular MAC, broadcast on the downlink and the AP or BS can control the uplink access according to QOS. Various examples herein assume a centralized framework 620, where a cluster head is responsible for coordinating the selection of the Broadcast Channel.

A cluster is formed when two or more devices are within RMC range of each other, following a discovery procedure initiated by one or more of those devices. The originator of the discovery procedure may generate a list of device IDs within range and their operating channels/frequencies and average SNR levels. This information may be exchanged with other cluster members for the purpose of establishing new device-pair links or other cluster related tasks.

In an example centralized framework, a cluster head is a device responsible for coordinating with other cluster members to establish a common channel that can be used for broadcast. The ability to communicate with other cluster members with an SNR above a minimum threshold may be used as a qualification for a device to provide this function. If a new cluster is formed, as described above, the originator of the discovery procedure may elect to operate as an interim cluster head or may select one of the newly discovered devices to fill the temporary function. Within the centralized framework, an interim cluster head device may be selected to coordinate the determination of a broadcast channel.

For this example, using a pseudo-random time delay, devices may opportunistically transmit a reference signal along with their device ID. The transmitted signals may be received by other devices within RMC reach. Each device may keep a Table of Ranking for received device IDs, SNR levels and supported features, such as, ability to operate as a cluster head. The devices may "compare notes", that is, exchange a copy of their table. Each device may combine or consolidate the data into a single table. The device able to connect with the greater number of devices with a SNR level above a predetermined threshold may be selected (e.g., unanimously) as cluster head.

In an example scenario, the current cluster head may become no longer able to operate effectively in that capacity, e.g., due to mobility or other topological changes in the cluster. In such event, a new cluster head may be selected. In some implementations, the next (e.g., second) entry in the Table of Rankings is selected (e.g., automatically) as new cluster head, if the device is still available; otherwise, the selection "goes down the list" to subsequent entries until a suitable new cluster head is found. In some implementations, the cluster head is reinitiated, e.g., using the selection procedure described above.

Figure 7:
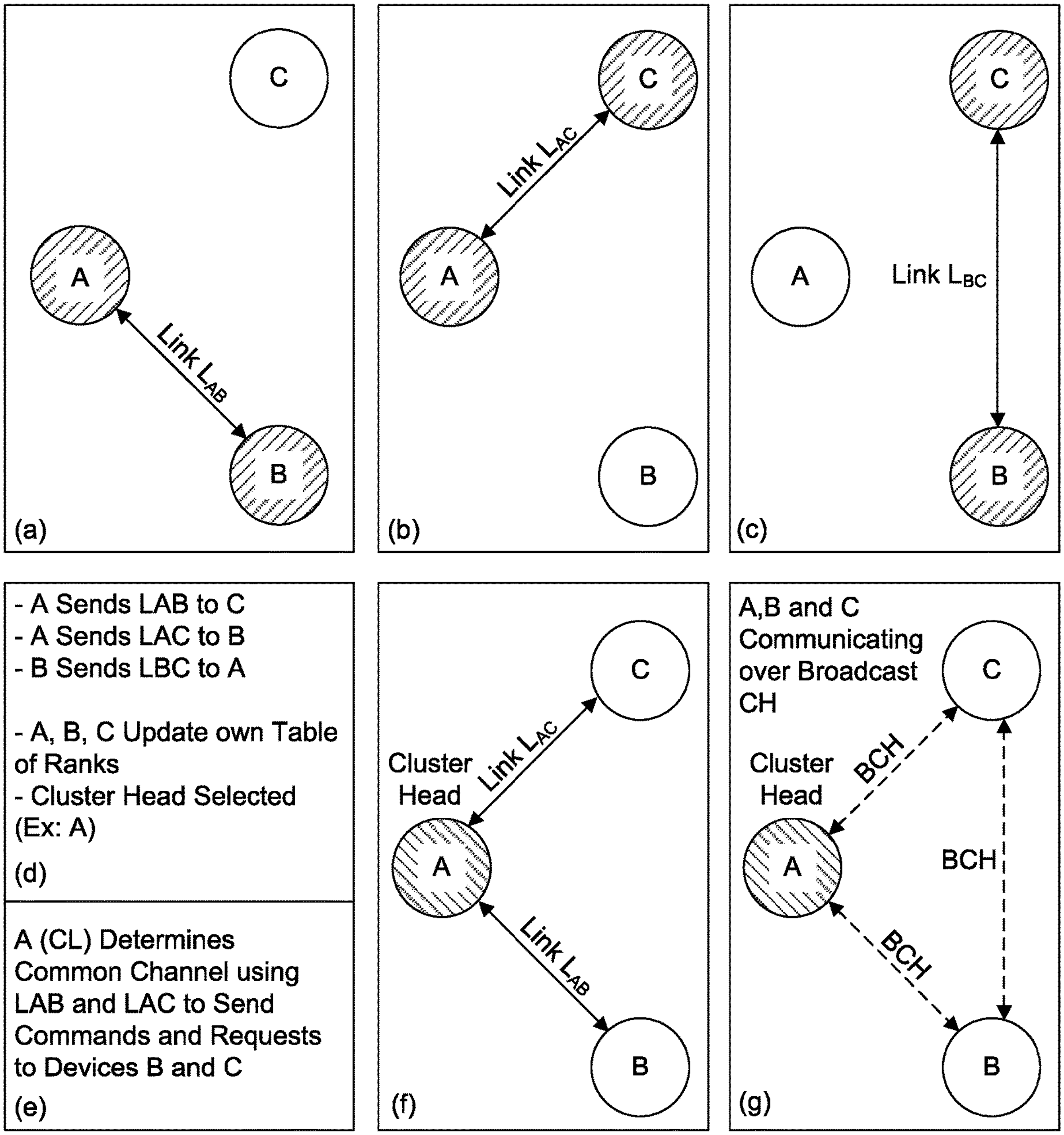
FIG. 7 is a block diagram illustrating example cluster head selection.
Figure 7A:
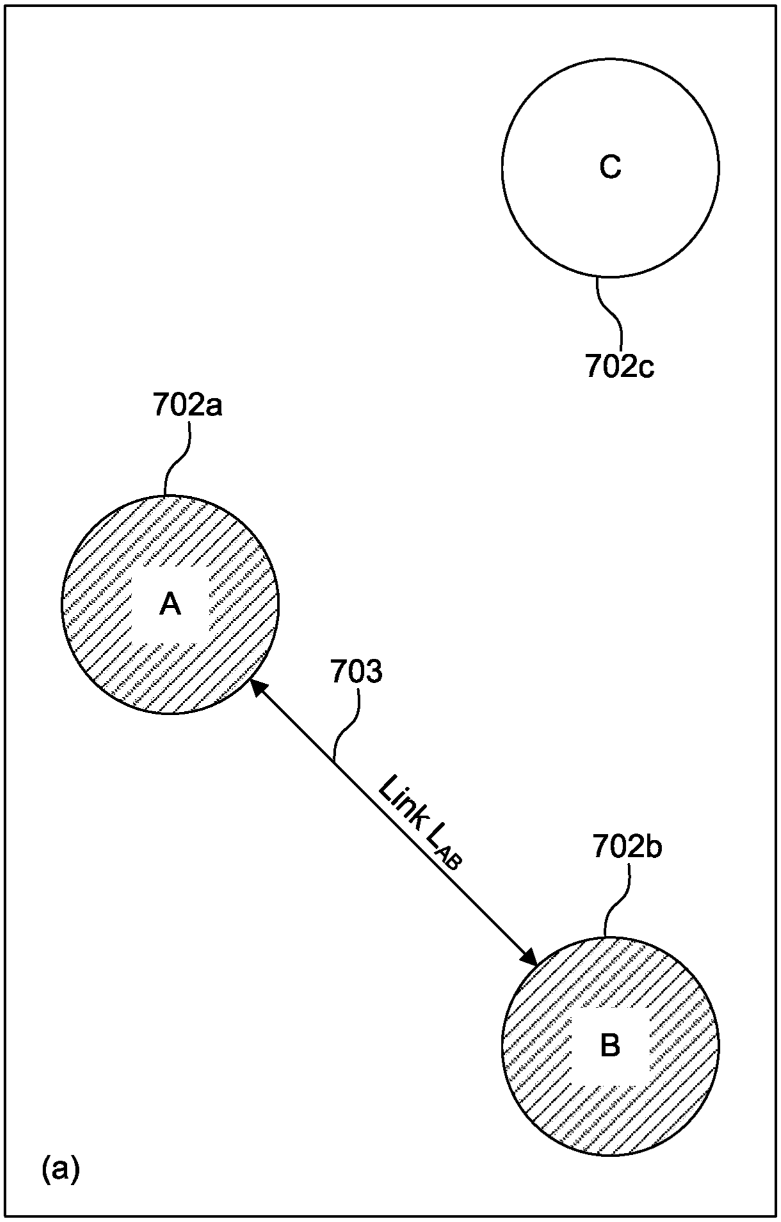
Figure 7B:
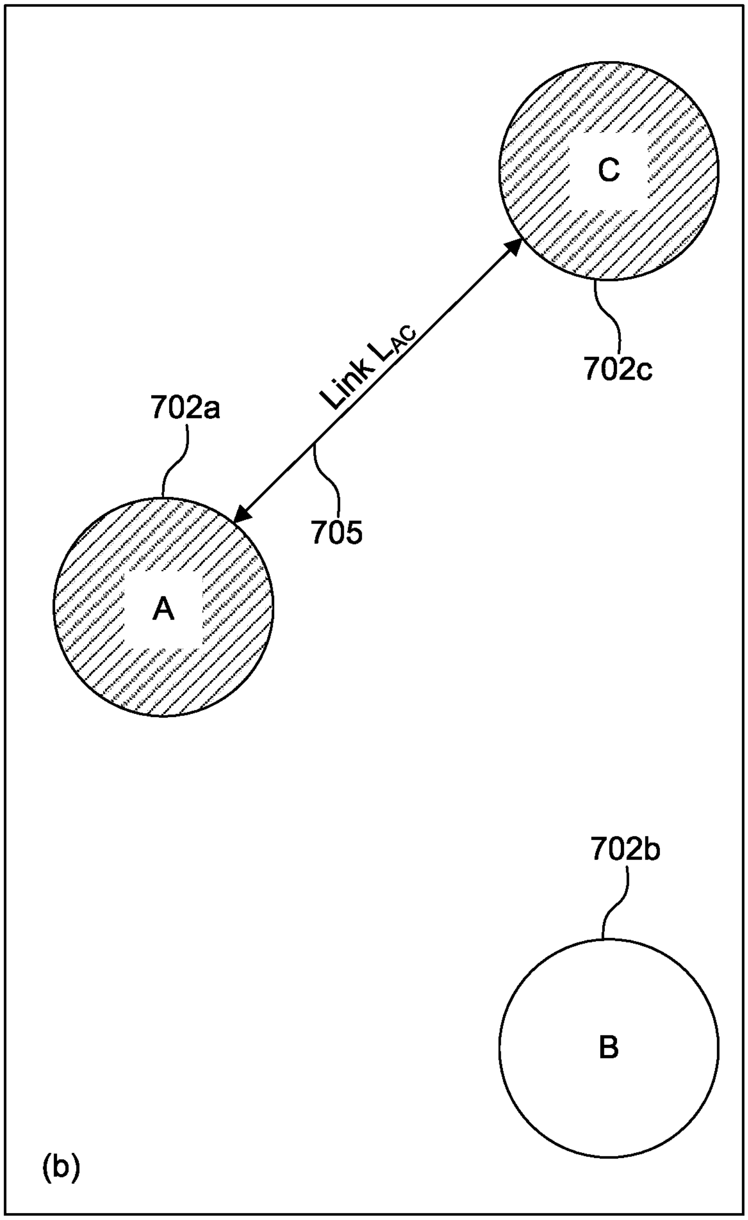
Figure 7C:
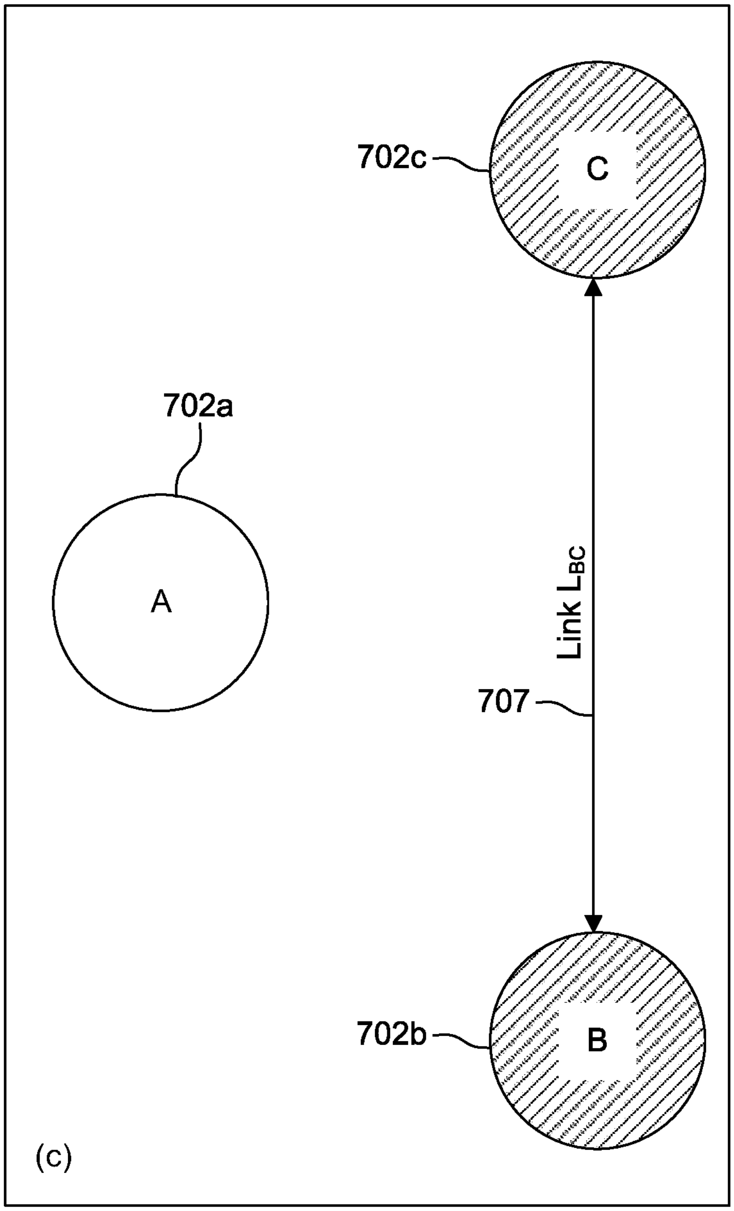
Figure 7F:
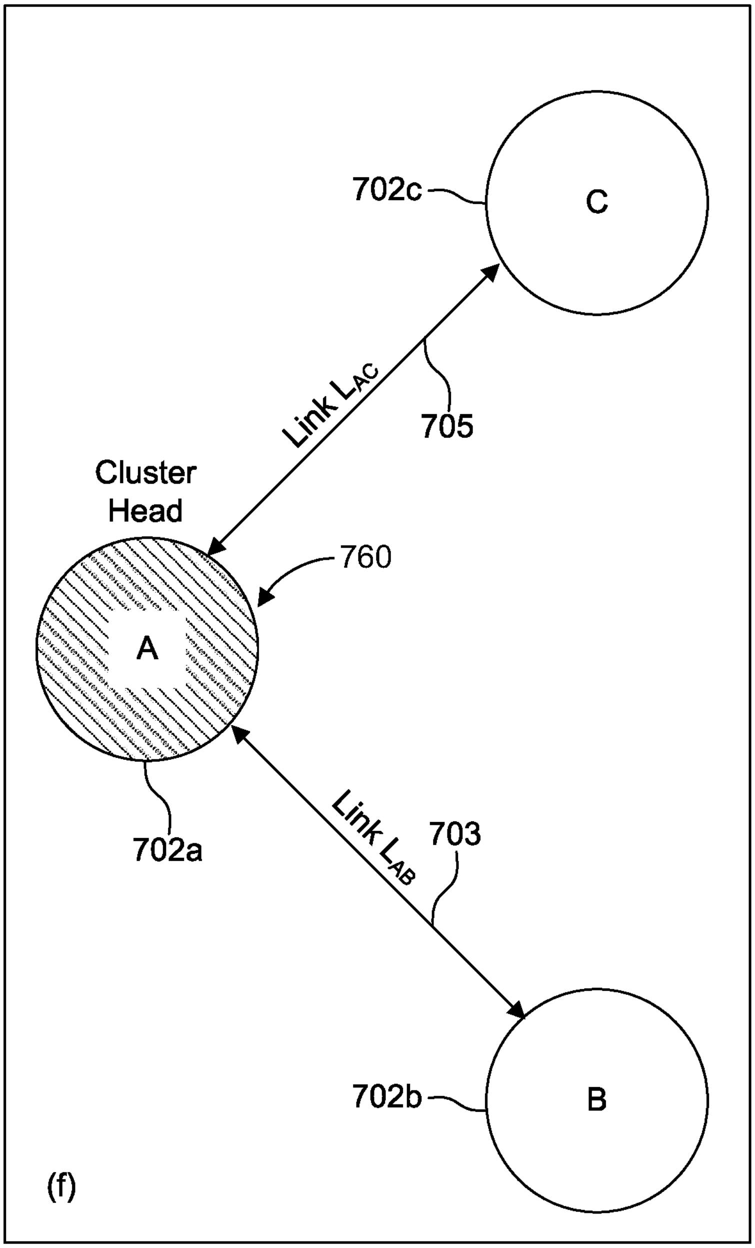
Figure 7G:
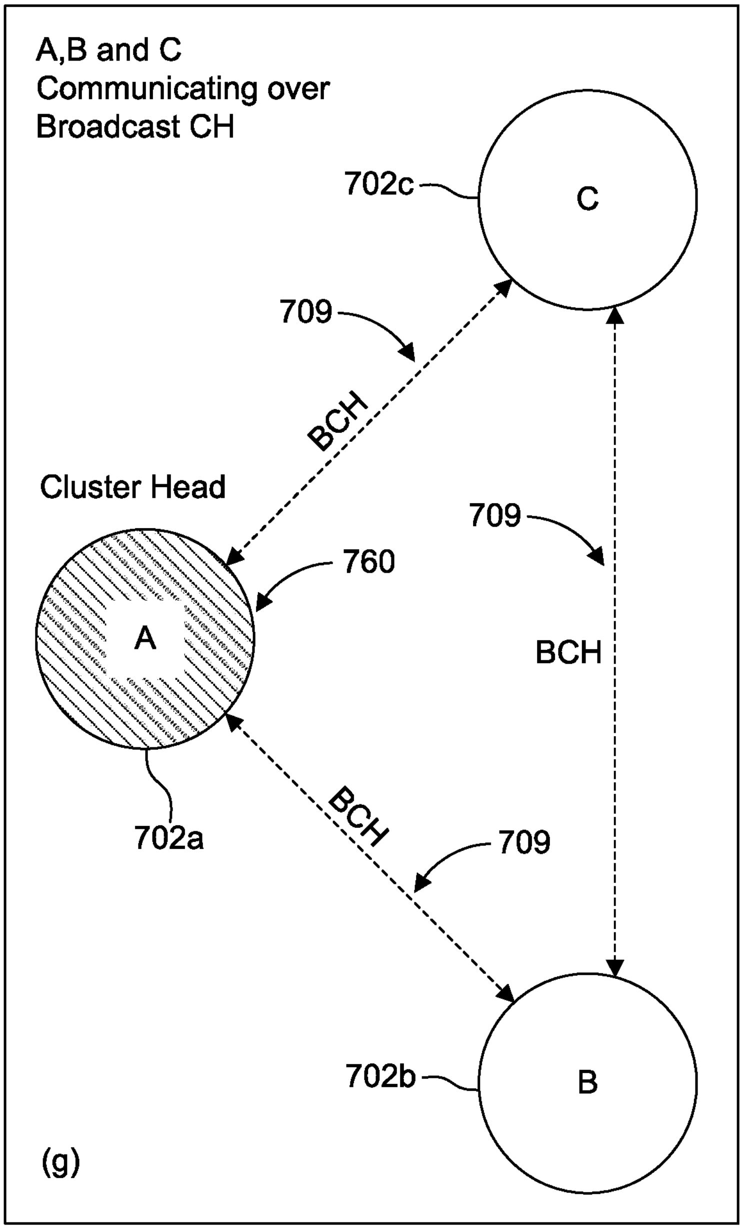

FIG. 7 is a block diagram illustrating example cluster head selection. Details of FIG. 7 are shown in FIGS. 7A-7G. For example, in FIGS. 7A-C, as a result of a discovery procedure, device A 702*a*, device B 702*b*, and device C 702*c* are able to communicate with each other on distinct links LAB 703, $L_{AC}$ 705, and $L_{BC}$ 707. In FIGS. 7D-7E, the three devices exchange their table of rankings. In FIG. 7F, the device with the best ranking is designated cluster head 760. In FIG. 7G, the new cluster head 760 coordinates the selection of a common Broadcast Channel 709.

In some implementations, information is provided to the cluster head by node devices to determine a common channel ($F_{com}$). In the following examples, a cluster head has already been selected and unicast links have already been established between the cluster head and node devices. In some implementations, a number of supported capabilities may be reported to the cluster head by the node devices.

In some implementations, supported frequency bands may be reported to the cluster head by the node devices, including a minimum frequency $F_{min}$ and a maximum frequency $F_{max}$ supported by the node device, and with minimum steps defined by the frequency raster. Battery charge level may also be indicated to the cluster head, e.g., for the purpose of setting task priority levels. In some implementations, the node devices measure a reference signal received from the cluster head and transmits a measurement or indicator of signal quality, such as an SNR or a received signal strength indication (RSSI) of the reference signal to the cluster head, which the cluster head may use to select the set of devices able to join a common channel and/or determine the broadcast channel center frequency. It should be understood that the devices described herein may measure either or both of the RSSI and the SNR directly in some implementations while in other implementations the SNR measurement may be inferred from the RSSI measurement.

In some implementations, device IDs and/or the power class associated with each node device may be reported to the cluster head. A device boasting a higher power class may be more tolerant of inefficiently coupled communication links. The device may compensate for a low coupling efficiency by transmitting at a higher power level.

In some implementations, the loop-to-coil coupling coefficient is reported to the cluster head by node devices (e.g., by each node device in range). In some implementations, the loop-to-coil coupling coefficient is conveyed as a configuration parameter or setting. In some implementations, the range of coupling supported and/or the incremental steps available (e.g., whether continuous or discrete) are reported to the cluster head by the node devices. In some implementations, this provides a measure of resolution setting for this device parameter (i.e., the loop-to-coil coupling coefficient).

Figure 8:
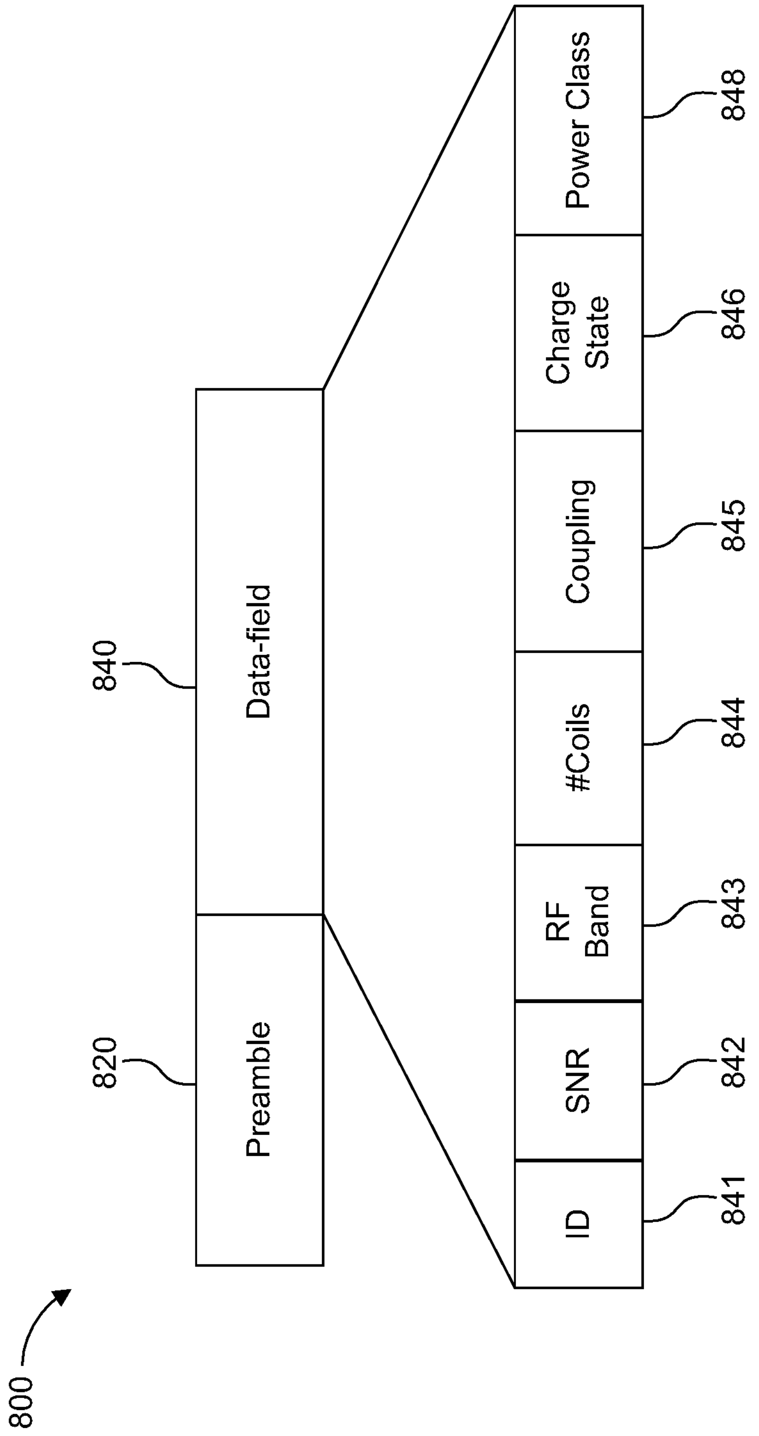
FIG. 8 is a block diagram illustrating an example message format for transmitting information from a node device to a cluster head.

FIG. 8 is a block diagram illustrating an example message format 800 for transmitting information (e.g., information to determine $F_{com}$, as described herein) from a node device to a cluster head. In some implementations, the message format 800 includes a preamble 820 followed by a body (labeled as "Data-field" in this example) 840 as shown in FIG. 8. In example format of FIG. 8 includes fields or subfields to communicate a device ID 841, SNR 842, RF Band 843, number of coil pairs 844 employed by the receiver and transmitter of the node device, coupling 845 between each coil pair, charge state 846, and/or power class 848. This is simply an example; in other implementations, more, less, or different information may be provided in the message, and other formats, or a modified version of this format, may be used.

In some implementations, frequency raster is predefined, e.g., by a Standard Organization. A channel raster may be defined by steps or frequencies that may be used by a communication device. For example, in the UMTS system, the channel raster is set at 100 kHz. For wireless power transmission using technologies other than radio frequency beam, the operating frequency of the WPT device may be 9 kHz or 10 kHz raster.

In some implementations, the minimum frequency $F_{min}$ and maximum frequency $F_{max}$ may be provided to the cluster head by the node devices. In some examples, the $F_{min}$ and $F_{max}$ for non-beam WPT systems may be 6,765-6,795 kHz. In some examples, the $F_{min}$ and $F_{max}$ for WPT systems (e.g., WPT systems using technologies other than RF beam) may be 19-21 kHz, 59-61 kHz, 79-90 kHz, 100-300 kHz, or 6765-6795 kHz. In some examples, the $F_{min}$ and $F_{max}$ for wireless power consortium (WPC) may be 87-205 kHz range.

Figure 9:
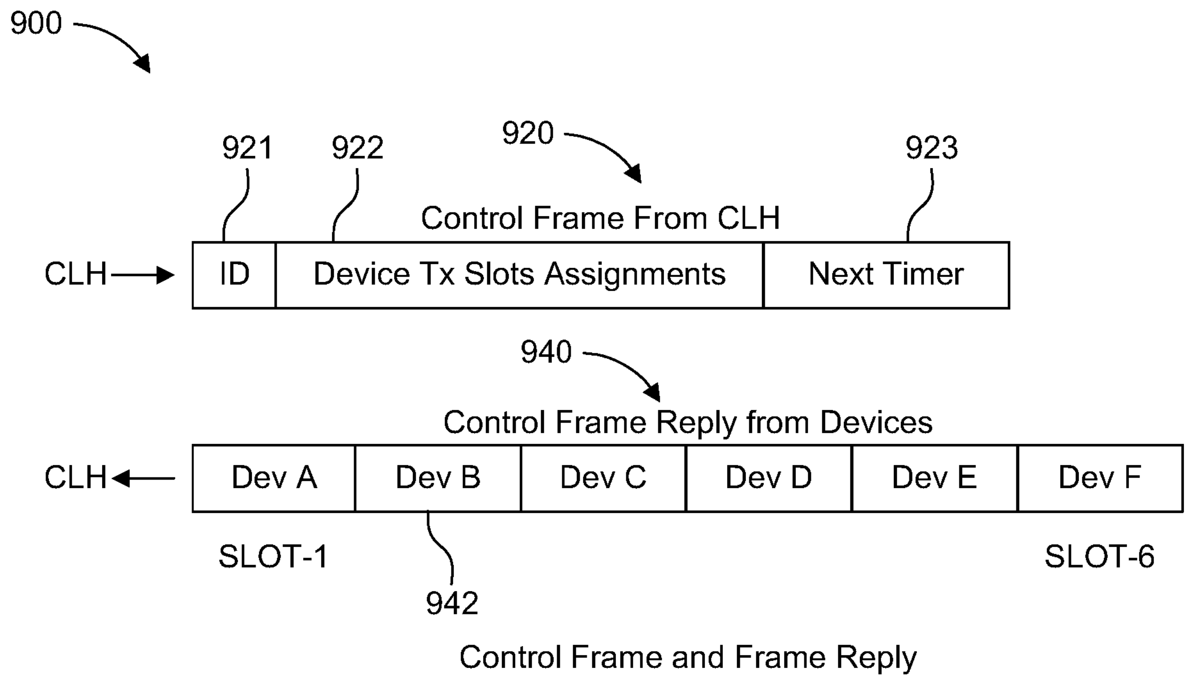
FIG. 9 is a block diagram illustrating an example control frame format and an example control frame reply format.

In some implementations, the cluster head sets a timer, and sends a value of the timer, e.g., in an ACK for a next transmission to a node. FIG. 9 is a block diagram illustrating an example control frame format 900 and an example control frame reply format. In this example, the cluster head transmits the example control frame 920 to one or more of the node devices. Node devices receiving the control frame respond with the example control frame reply 940. In this example, the control frame includes a device ID 921, device transmission slot assignments 922, and a value of the timer 923. The control frame reply includes a reply from each device in a slot 942 corresponding to its transmission slot assignment. These are simply examples; in other implementations, more, less, or different information may be provided in the control frame and/or control frame reply, and other formats, or a modified version of these formats, may be used.

Figure 10:
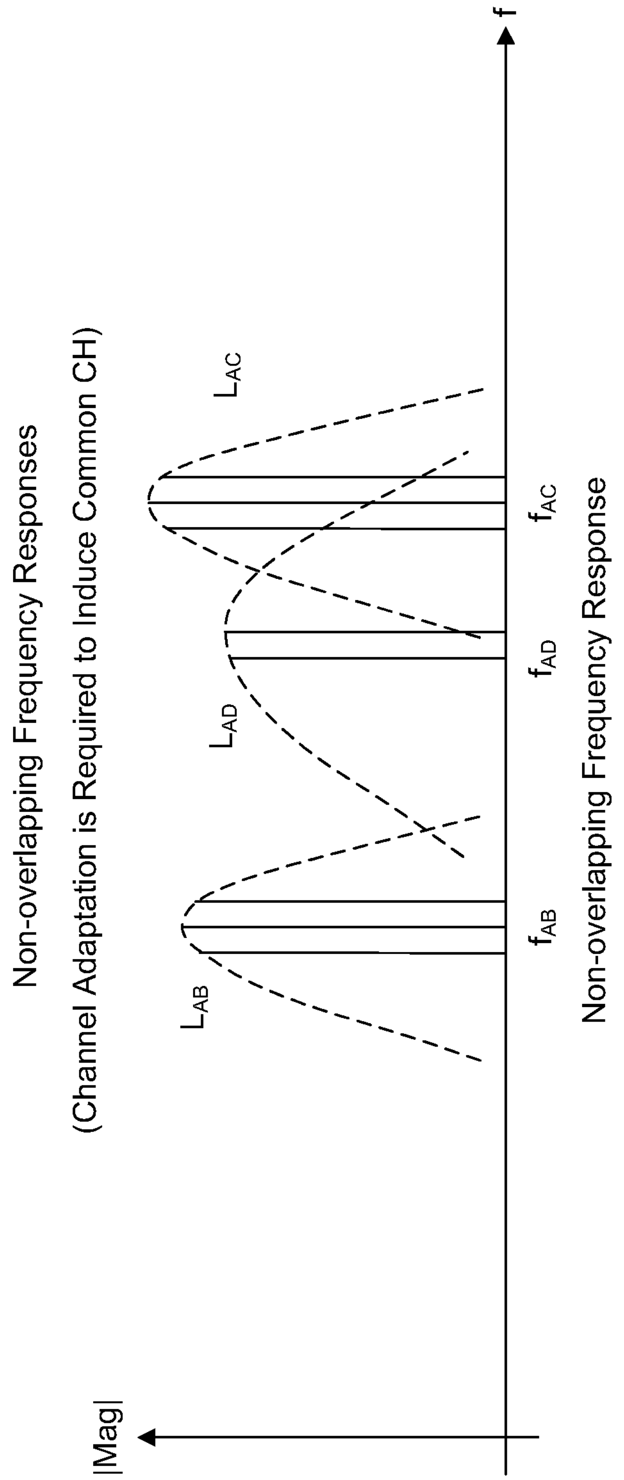
FIG. 10 is a graph illustrating example non-overlapping frequency responses.

Some implementations provide for selection and/or election of a broadcast channel. In some examples, a WTRU, acting as a cluster head, determines a common channel where all devices within RMC range can listen to and respond to broadcast information. FIG. 8 is a graph illustrating example non-overlapping frequency responses, expressed as power signal magnitude (e.g., decibel-milliwats (dBm)) versus frequency. FIG. 9 is a graph illustrating an example common channel for broadcast between overlapping frequency responses, expressed as power signal magnitude (e.g., decibel-milliwats (dBm)) versus frequency. FIG. 10 is a graph illustrating example SNR contour measurements, expressed as frequency versus time.

Figure 11:
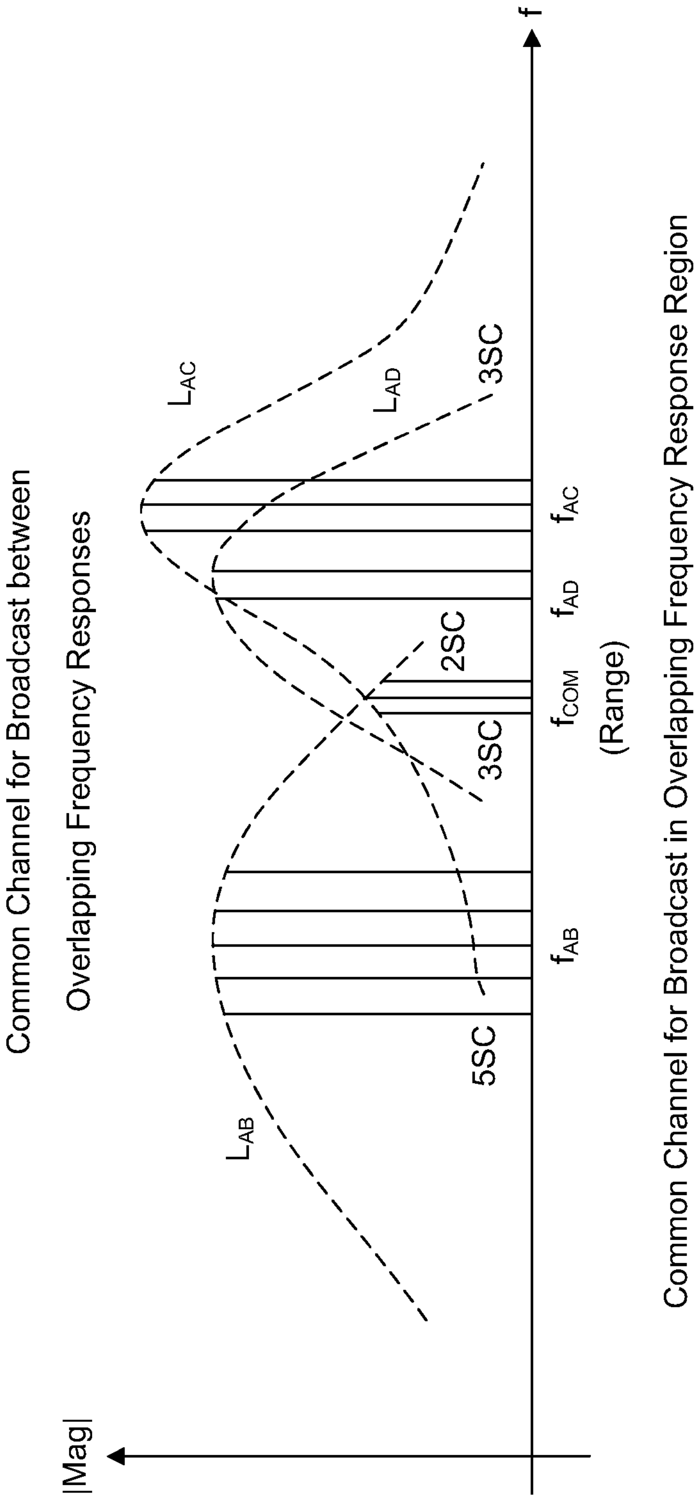
FIG. 11 is a graph illustrating an example common channel for broadcast between overlapping frequency responses.
Figure 12:
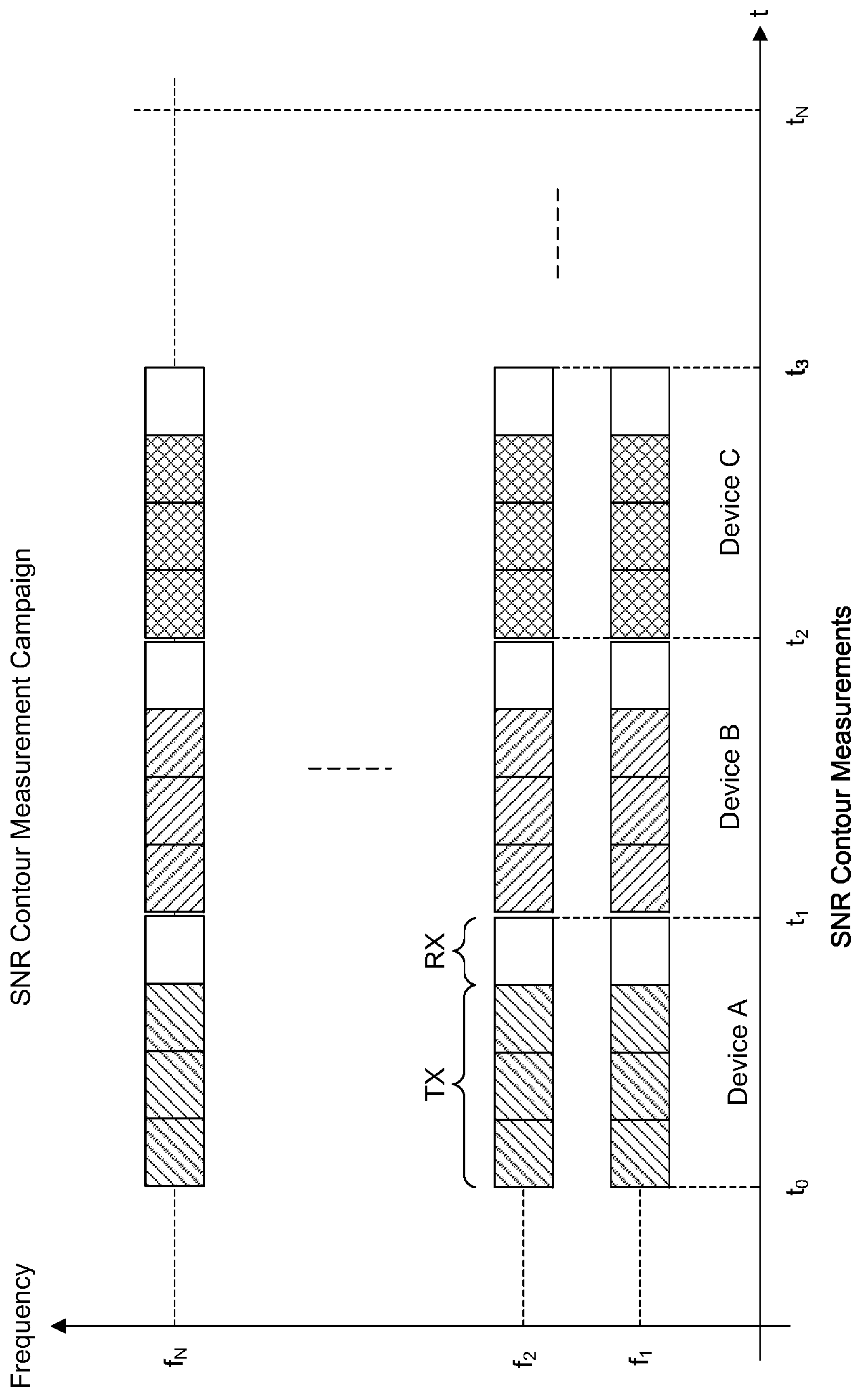
FIG. 12 is a graph illustrating example SNR contour measurements.

In some implementations, a WTRU may determine that it has been selected by a group of devices as the new cluster head. The WTRU may utilize the previously detected unicast links to each of the cluster members, during the device discovery procedure, to sequentially receive their device capabilities e.g. range of supported loop-to-coil coupling coefficients and associated sizes. The WTRU may request SNR contour reports from each cluster member, if they are already available and/or stored. Otherwise, the WTRU may initiate a SNR contour measurement procedure for specific member(s), e.g., as depicted in FIG. 12. The WTRU may utilize the SNR contours and received device capabilities to determine the loop-to-coil and coupling coefficients for each device such that a common channel can be induced with a minimum RSSI or an SNR that meets the required QoS of the broadcast channel. The WTRU may determine the common channel characteristics, e.g. carrier frequency, number of subcarriers/BW available, and supported signal modulation and coding. The WTRU may convey the common channel and broadcast channel characteristics, the device configuration (e.g., loop-to-coil and coupling coefficients) that induces this channel, periodicity of broadcast channel induction, and/or access parameters to the cluster members. Example resulting channel characteristics are shown in FIG. 11.

In some implementations, a WTRU acting as a cluster head initiates an SNR contour measurement procedure. The WTRU may allocate a time slot to each device within the cluster, The WTRU may request that each device transmit a reference signal in its respective time slot and designated raster frequency. The WTRU may listen for and record the signals transmitted by each member device in their assigned time window. The WTRU may move to the next predefined raster frequency and repeat listening and recording until the final raster frequency has been completed. The recorded SNR levels for each device at every raster frequency may provide the contour reports for the current cluster topology and describe the frequency response for each device in the cluster.

In some implementations, a WTRU, after determining that it has been selected by a group of devices as the new cluster head, transmits a notification to the nodes to trigger a device capabilities message from the nodes. In response, the nodes transmit these messages, which the WTRU receives to obtain their device capabilities, e.g., including range of supported loop-to-coil coupling coefficients and associated step sizes. In some implementations, the WTRU utilizes previously detected unicast links to each of the cluster members. In some implementations, the WTRU receives the device capabilities from each node device sequentially.

The WTRU may request SNR contour reports or other signal quality indications from each cluster member; e.g., after receiving the device capabilities. The WTRU may utilize the SNR contours or signal strength measurements to determine the loop-to-coil and coupling coefficients for each device e.g., such that a common channel can be induced with a minimum RSSI or a SNR level meeting the required QoS of the broadcast channel. The WTRU may determine the common channel carrier frequency, available bandwidth, and supported signal modulation and coding, e.g., after inducing the common channel. The WTRU may convey the broadcast channel and device configuration to the cluster members, e.g., after determining the common channel carrier frequency, available bandwidth, and/or supported signal modulation and coding.

Some implementations include SNR contour measurement and reporting. SNR contour refers to a measure of the frequency response of a device coupled in a resonance magnetic environment. After receiving a request from a cluster head, the WTRU may periodically transmit a reference signal over a frequency band of interest, e.g., at a pre-specified frequency increment, e.g., for a set duration. The cluster head may tabulate the received reference signal levels across the assigned radio spectrum to characterize the frequency response of the device over the current link, as illustrated in FIG. 10. FIG. 10 is a graph illustrating example non-overlapping frequency responses. In the figure, $L_{AB}$ is the frequency response of link AB, and $f_{AB}$ is the center frequency of the frequency response $L_{AB}$. $L_{AC}$ is the frequency response of link AC, and $f_{AC}$ is the center frequency of the frequency response $L_{AC}$ $L_{AD}$ is the frequency response of link AD, and $f_{AD}$ is the center frequency of the frequency response $L_{AD}$. FIG. 11 is a graph illustrating a common channel for broadcast in overlapping frequency response regions.

To generate contours for multiple WTRUs, the cluster head may assign a time slot to each device for transmission and reception. In some implementations, a timer is used to determine the repetition rate or periodicity of transmission. FIG. 12 is a graph illustrating example time slots for transmission and reception by example node devices. As shown in FIG. 12, device A will transmit on $f_1$ at $t_0$, device B will start its transmit and receive cycle at $t_1$. The cluster head, camping on $f_1$, will tabulate the signal strength measurements for each device and transmit an ACK during the RX time slot. After the last device in the group completes its transmission on $f_1$, the timer expires, and the cycle is repeated on $f_2$. The measurement campaign is completed after the last transmission on $f_N$ in this example. In some implementations, the cluster head may request node devices to perform SNR contour measurements for a range of loop-to-coil coefficients upfront that could be specified differently for each node device. This request may be determined based on capabilities of each device and what the cluster head determines from characteristics from its unicast link.

In some implementations, the cluster head may offload the contour data collection and tabulation to member devices. For example, after receiving the request from a cluster head, member WTRUs may periodically measure a set of RSSI for a reference signal transmission coming from the cluster head over the frequency band of interest, e.g., at a pre-specified frequency increment for a set duration. In some implementations, the node devices tabulate the received reference signal levels across the assigned radio spectrum and (e.g., when prompted) transmit the collected data to the cluster head for processing.

Figure 13:
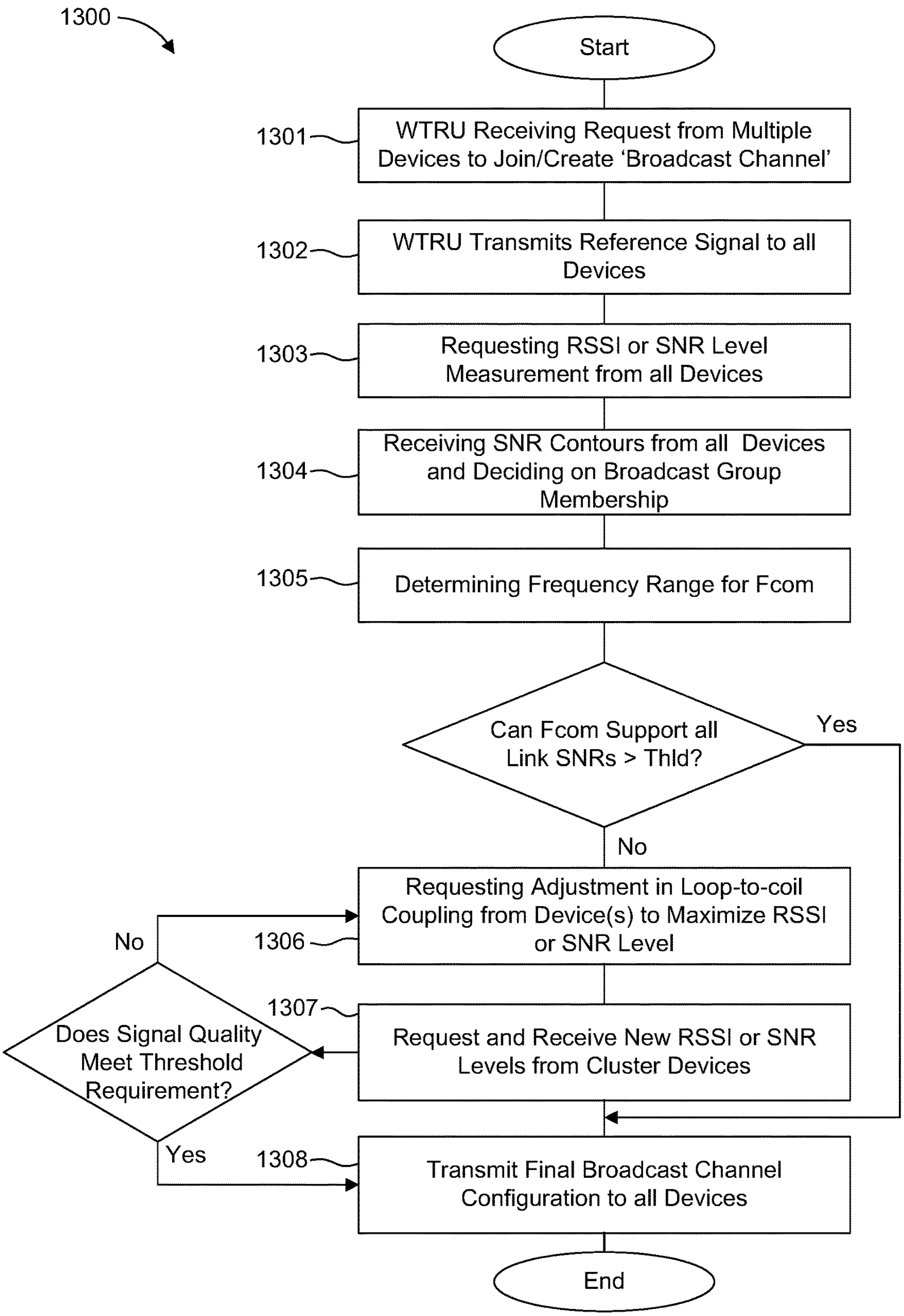
FIG. 13 is a flow chart illustrating example determination of a broadcast channel.

FIG. 13 shows a flow chart 1300 illustrating an example determination of a broadcast channel. The flowchart of FIG. 13 summarizes example steps of the example broadcast channel selection procedure. In the example of FIG. 13, at 1301, a WTRU may receive a request from a plurality of devices to join and/or create a Broadcast Channel. The WTRU may, at 1302, transmit a reference signal to the plurality of devices. The WTRU may, at 1303, request indications such as RSSI or SNR (i.e., signal quality) level measurements from each of the plurality of devices. The requested indications or measurements of signal quality may be for a device-specific frequency range. The WTRU may, at 1304, receive the RSSI or SNR level measurements (e.g., expressed as SNR contours) from each of the plurality of devices and may determine which of the devices will have membership in the broadcast group (i.e., will be able to receive the broadcast). The WTRU may, at 1305, determine a frequency range for $F_{com}$, where $F_{com}$ represents a range of overlapping frequency responses suitable for a common channel which may become the broadcast channel. If the $F_{com}$ results in a link between the WTRU and the plurality of the devices that does not meet (i.e., is not at or above) a threshold quality level (e.g., above a threshold RSSI or SNR value), then the WTRU may, at 1306, request each of the devices which will have membership in the broadcast group (other "cluster devices") to adjust its loop-to-coil coupling coefficients to maximize RSSI or SNR level. The WTRU may, at 1307, request and receive new signal quality indications such as the RSSI or SNR level measurements from the cluster devices. The WTRU may, after receiving the indications of signal quality (e.g., RSSI or SNR level measurement indications), check whether the signal quality meets the required threshold level and repeat the actions or 1306 and 1307 if it does not. If, however, after 1305, the determined $F_{com}$ results in a link between the WTRU and the plurality of the devices that is above a threshold quality level, then after 1305, the WTRU may, at 1308, transmit a Broadcast Channel configuration to all of the cluster devices. Some implementations include methods and devices configured to generate a fast common channel ($F_{com}$) estimate. This is illustrated in the sequence shown in FIGS. 14A, 14B, 14C, as well as by process flow shown in FIG. 15 as further described herein. In the following examples, at 1501, the cluster head and member devices are in communication, and it is assumed that unicast links exist between cluster head and each node. In some implementations, SNR contour reports are not necessary for this accelerated approach to determining a fast $F_{com}$ estimate. In some implementations, the determination is primarily computation based, and may provide the advantages of reduced latency and/or fast convergence to a solution.

In some implementations, a fast $F_{com}$ estimate is determined by calculating, at 1502, the median frequency for all unicast links between the cluster head and devices. After the median of the ordered set of link center frequencies is determined, the median frequency is shifted further towards the half of the spectrum with a higher concentration of devices to arrive at a first estimate for a Broadcast channel.

In some implementations, the range (i.e., the difference between the highest and lowest frequency values in the data set) impacts the ability of a single cluster head to include all devices on the new Broadcast channel.

Figure 14A:
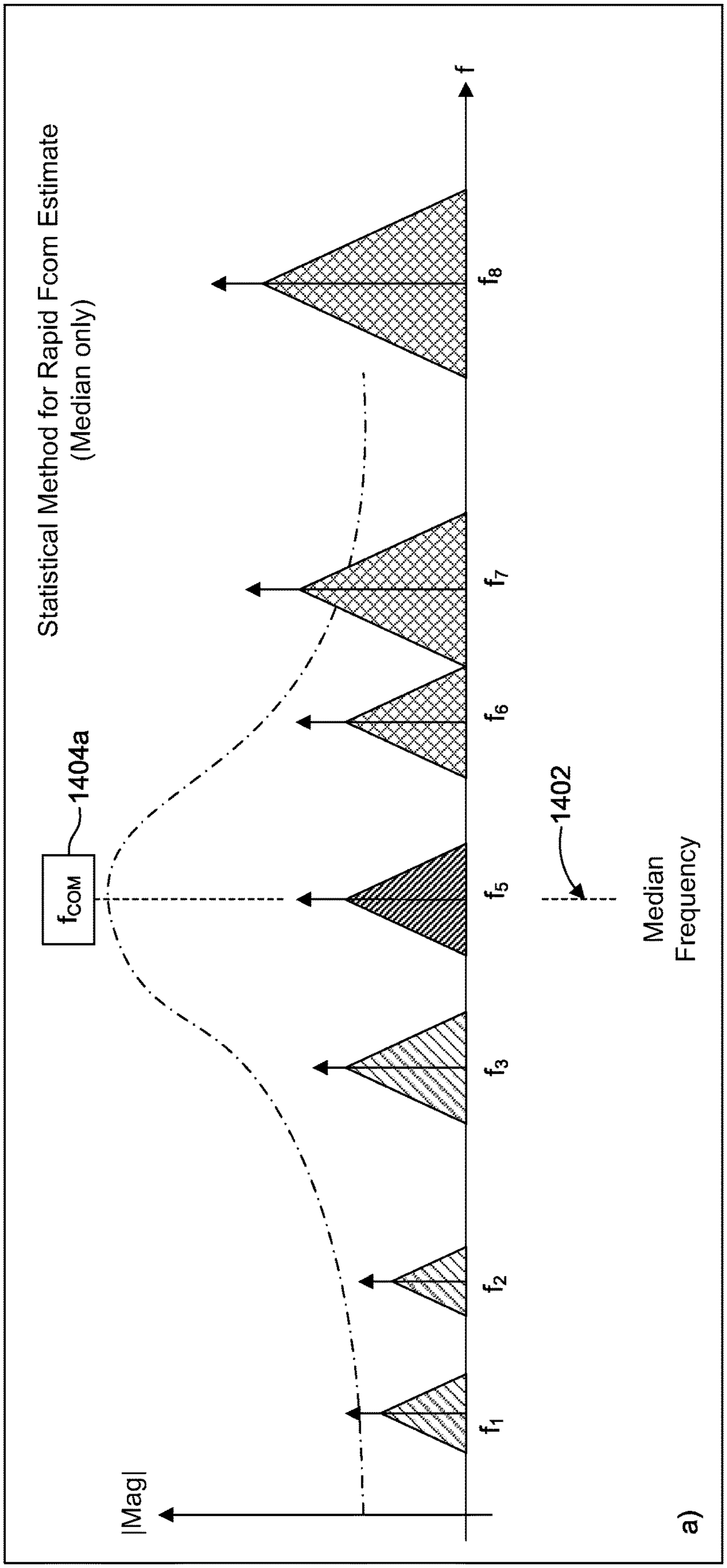
FIG. 14A is a graph illustrating example frequencies of unicast links between a cluster head and node devices.
Figure 14B:
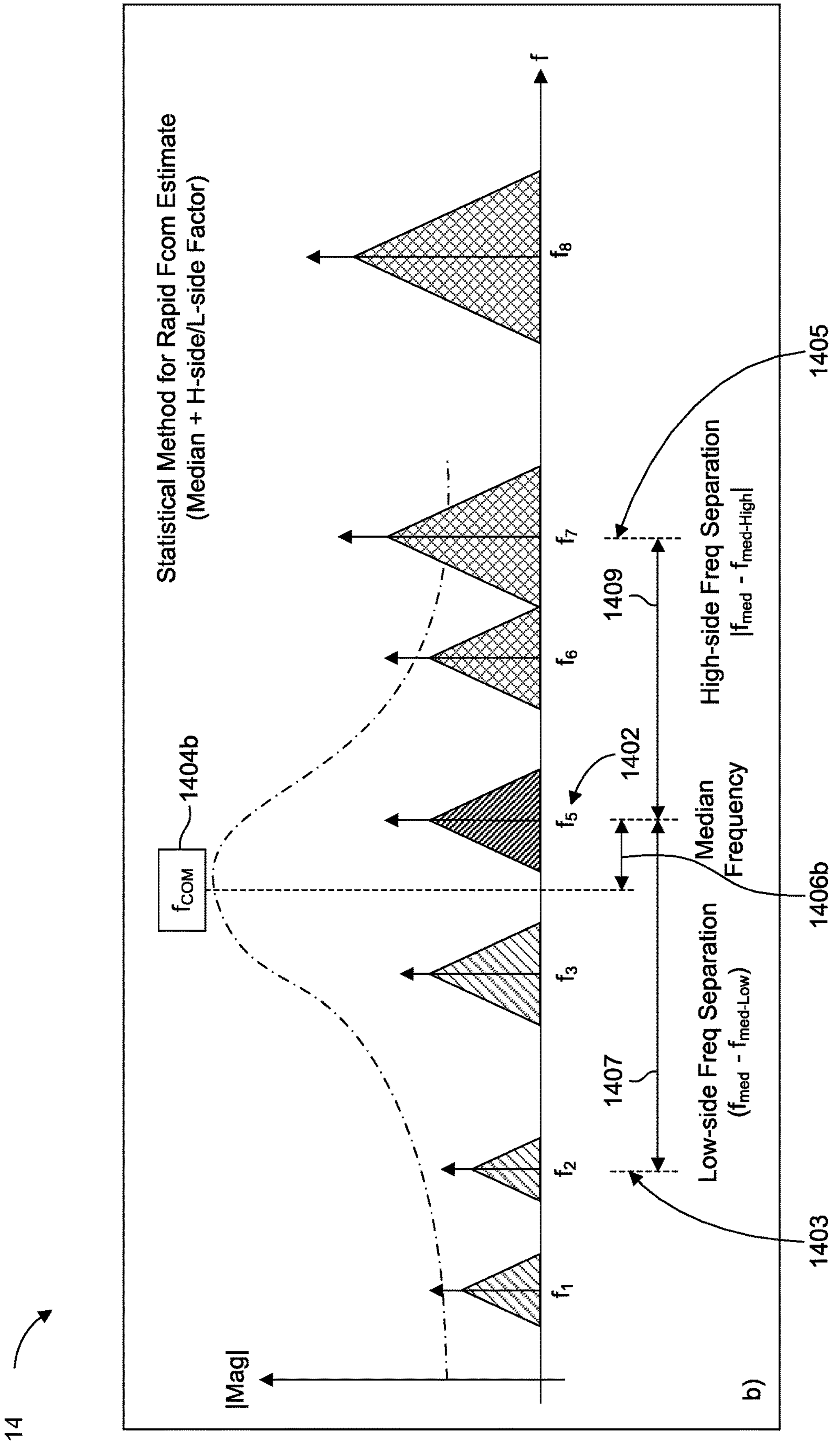
FIG. 14B is a graph illustrating example frequencies of unicast links between a cluster head and node devices.
Figure 14C:
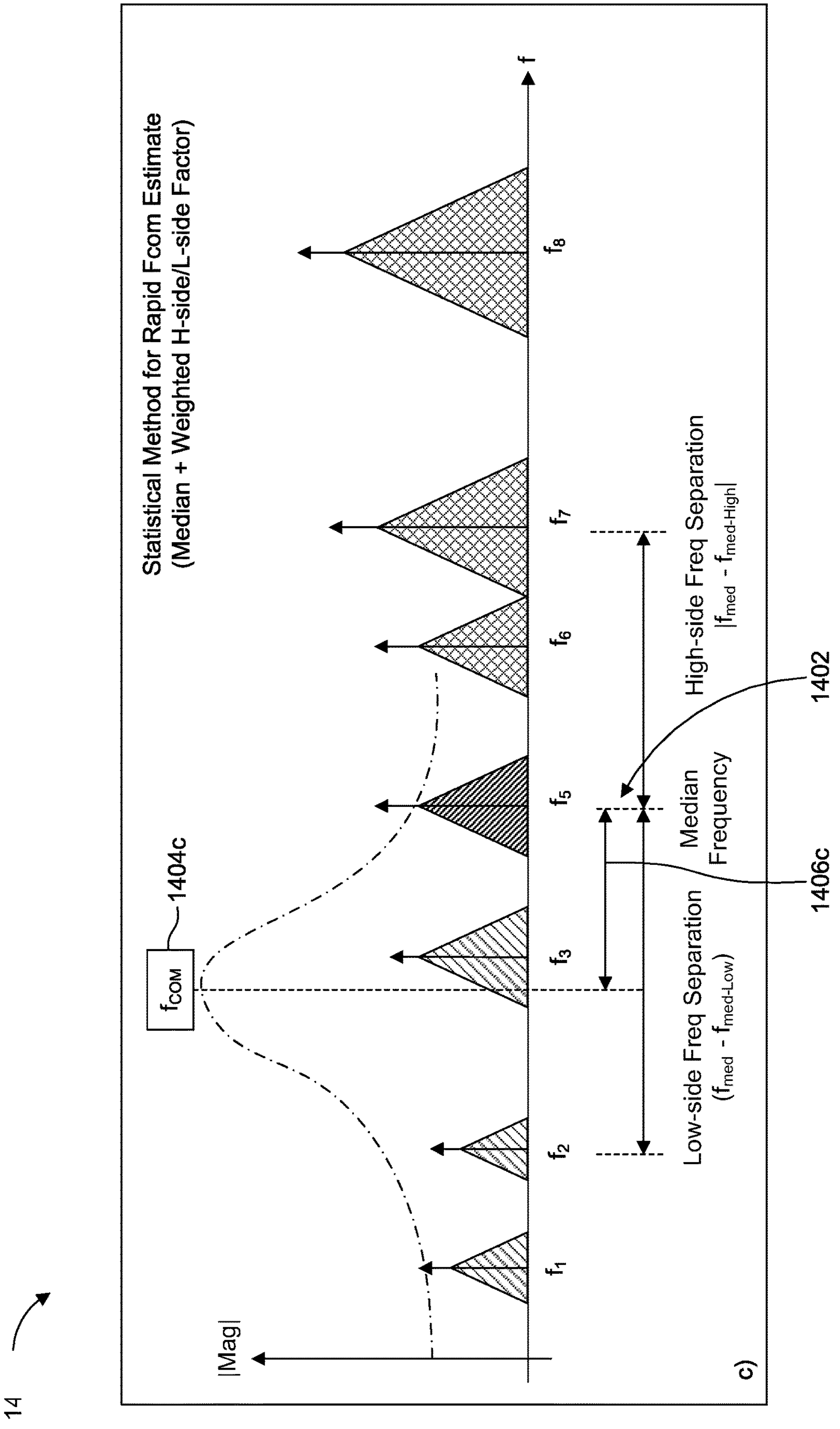
FIG. 14C is a graph illustrating example frequencies of unicast links between a cluster head and node devices.

In some implementations, the cluster head calculates, at 1502, the statistical median frequency value using unicast link configuration data for each device. This median will split the cluster devices into two equal groups but will not provide information on the spread of each group. For example, one group may be tightly clustered to the immediate left of the median frequency while the other may be dispersed farther on the right side. The simplicity of this method will generate a quick first estimate for a common frequency. For example, FIG. 14A illustrates example graph 1400*a* frequencies of all unicast links between the cluster head and node devices, where $f_5$ 1402 is the median frequency. Here, $f_5$ 1402 is used as an estimate for $F_{com}$ 1404*a*.

In some implementations, after calculating, at 1502, the median frequency, the cluster head determines, at 1503, the median frequency 1403 for the subset of device unicast links below the median channel (left side of the spectrum), and determines, at 1504, the median frequency 1405 for the subgroup above the median (right side of the spectrum). After determining the median frequencies, the cluster head determines, at 1505, the separation 1407 between the absolute value of the median and the low-side sub-group median and the separation 1409 between the absolute value of the median and the high-side sub-group median. The cluster head determines, as a difference between the two measures of separation, a frequency offset 1406*b* that may be added to the median to produce, at 1507, a better estimate of a common channel where the spread or deviation of the unicast links about the median are taken into account. The resulting $F_{com}$ 1404*b* in this example is described by the graph of FIG. 14B.

In some implementations, the cluster head determines, at 1507, an estimate of $F_{com}$ using a weighted average measure of separation, where the received signal strength for each unicast link is combined with the frequency separation for each device to determine a "weighted" median frequency value for $F_{com}$. As a result, at 1506, the median frequency is slightly shifted 1406*c* towards the side of the spectrum where devices reported lower average signal strength. In some implementations, this has the advantage of providing better coupling efficiency to those devices, e.g., since WTRU with stronger RSSI may tolerate a weaker coupling to the common channel. The resulting $F_{com}$ 1404*c* in this example is described by the graph 1400*c* of FIG. 14C.

In some implementations, the cluster head determines, at 1505, a measure of distance or frequency separation between the median for the overall group and the medians for right and left half of the spectrum. In this example, frequency separation is used to provide, at 1506, a correction factor that to shift 1406*c* the group median frequency to the right or left. In some implementations, the correction factors are scaled by the signal level for each link. The goal is to arrive at a common frequency and broadcast channel tilted towards the weaker links and also favoring links clustered farther from the median, ultimately resulting in better overall reach or coverage within the cluster. The resulting $F_{com}$ 1404*c* in this example is described by the graph 1400*c* of FIG. 14C.

In some implementations, the cluster head determines an estimate of $F_{com}$ based on frequency splitting; e.g., by splitting the difference in frequency separation between two unicast links (i.e., choosing the midpoint between the two frequencies associated with the unicast links).

Figure 15:
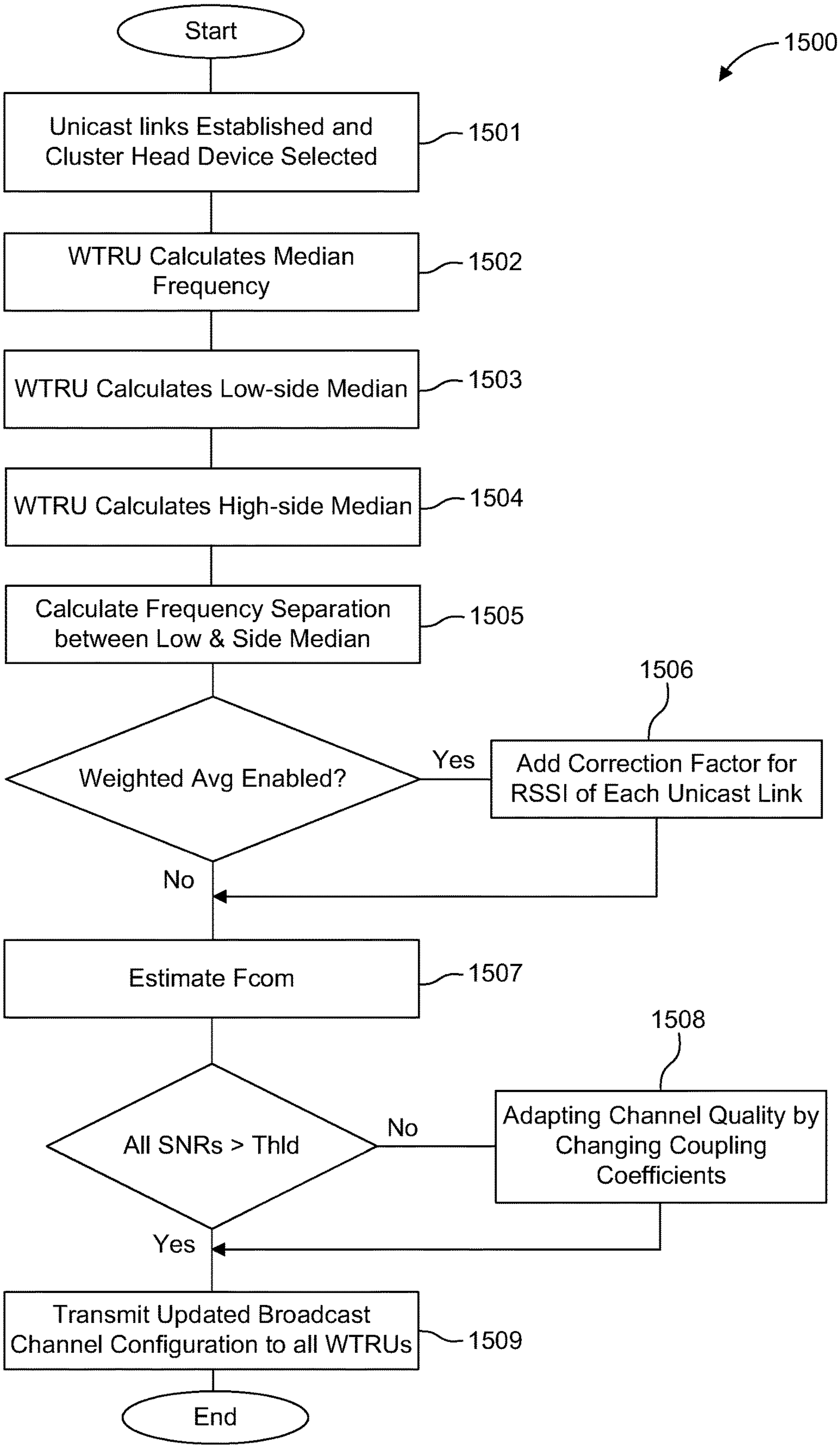
FIG. 15 is a flowchart illustrating an example method for determining a broadcast frequency.

For example, node devices A and B are each in a unicast link with the designated cluster head (CLH). The cluster head calculates the difference in frequency separation between A and B. The cluster head splits the difference between unicast link frequencies for link CLH-to-device A and CLH-to-device B, resulting in a common channel Horn for devices A, B and the cluster head device. Here, the common channel is determined as the average point between the two unicast link frequencies, that is: [(Freq_CL-to-A)+(Freq_CL-to-B)]/2. In some implementations, a new device C appearing in range is accommodated by further halving the difference between the current $F_{com}$ and the frequency for the unicast link between device C and cluster head to determine a new common channel $F_{com}$'. In some implementations, the cluster head may request devices A, B and C to change their coupling factors, e.g., to improve SNR on the newly determined $F_{com}$' Broadcast channel. The flowchart 1500 of FIG. 15 illustrates an example method for $F_{com}$ estimation, which may be referred to as "fast" $F_{com}$ estimation.

In some implementations, a subset of devices in a cluster communicate over a separate Groupcast Channel. Higher data rates and SNR may be achieved, relative to the Broadcast Channel, and information relevant to the sub-group may be exchanged over the Groupcast Channel. In some implementations, a local cluster head is selected, similarly to the Broadcast scenario described above. The cluster head may determine the Groupcast Channel. Group related communications may take place over the Groupcast Channel.

In some implementations, a WTRU acting as a cluster head receives a request to initiate group communication across multiple cluster members with one or more specific QoS requirements. The WTRU utilizes device capabilities and requests SNR contour reports from each cluster member. The WTRU utilizes the SNR contours and received device capabilities to determine the loop-to-coil and coupling coefficients for each device such that a common channel can be induced with a minimum SNR that meets the required QoS of the Groupcast Channel. The WTRU determines the common channel characteristics, e.g., carrier frequency, number of subcarriers/BW available, and supported signal modulation and coding. The WTRU may convey the Groupcast Channel characteristics, the device configuration (e.g., loop-to-coil and coupling cooefficents) that induces this channel, periodicity, and/or access parameters to the cluster members.

Figure 16:
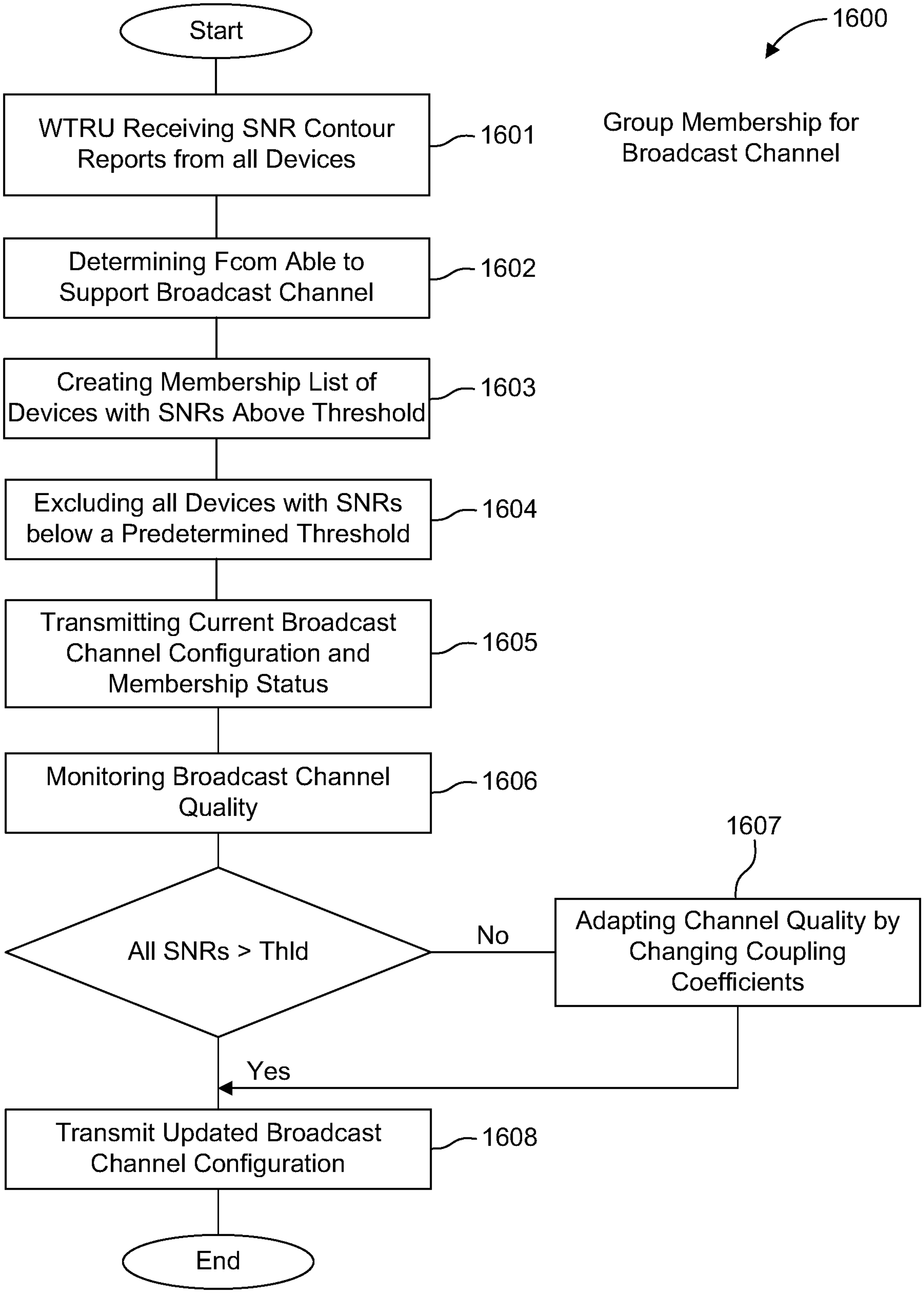
FIG. 16 is a flow chart illustrating example determination of group membership for a broadcast channel.

Some implementations decide on group membership and adapt link quality. In some cases, some devices may be out of range or may not be able to communicate on the broadcast channel due to their location or orientation within the cluster. In some implementations, the cluster head may address this scenario as explained in the following description of the determination of group membership. FIG. 16 is a flow chart 1600 illustrating example determination of group membership for a broadcast channel. In the example of FIG. 16, the WTRU may, at 1601, receive a SNR contour report from all candidate devices for the broadcast channel. The WTRU may, at 1602, determine, based on the SNR contour reports, a $F_{com}$ that is able to support the broadcast channel. The WTRU may, at 1603, create a membership list of those of the plurality of devices which report a signal quality (e.g., an SNR) at or above a threshold level. The WTRU may, at 1604, exclude all devices not on the membership list from the broadcast channel. The WTRU may, at 1605, transmit the current broadcast channel configuration and membership status to all of the candidate devices to the broadcast channel. The WTRU may, at 1606, monitor broadcast channel quality. If any of the SNR contour reports indicate an SNR that is not greater than a threshold, the WTRU may, at 1607, adapt the quality of the broadcast channel by changing coupling coefficients. The WTRU may, at 1608, transmit an updated broadcast channel configuration to all of the devices on the broadcast channel.

In some implementations, the WTRU receives SNR contour reports for each device in RMC range and determines a common frequency $F_{com}$ that is able to support broadcast communication with SNR above a predetermined threshold. A membership list may be created, including all devices able to support a minimum SNR on the broadcast channel. All devices reporting signal quality levels (e.g., via SNRs) below a predetermined threshold and with a relatively high-performance cost (e.g., above a threshold cost) associated with adding those devices to the broadcast channel, may be excluded from the membership list. The WTRU may notify the devices that were excluded from the membership list by sending the excluded devices a series of unicast messages informing them of the declined status of their membership. The WTRU may also transmit current Broadcast Channel configuration and membership status to all devices in range. The cluster head may monitor the broadcast channel quality and request that devices adjust their coupling factors to maintain a minimum broadcast link quality.

Some implementations handle a request from a new device appearing within RMC range. In some implementations, a new device appearing within RMC range may request to join the existing broadcast channel. The cluster head may verify that adding this new member to the broadcast channel will not adversely impact the channel quality.

Figure 17:
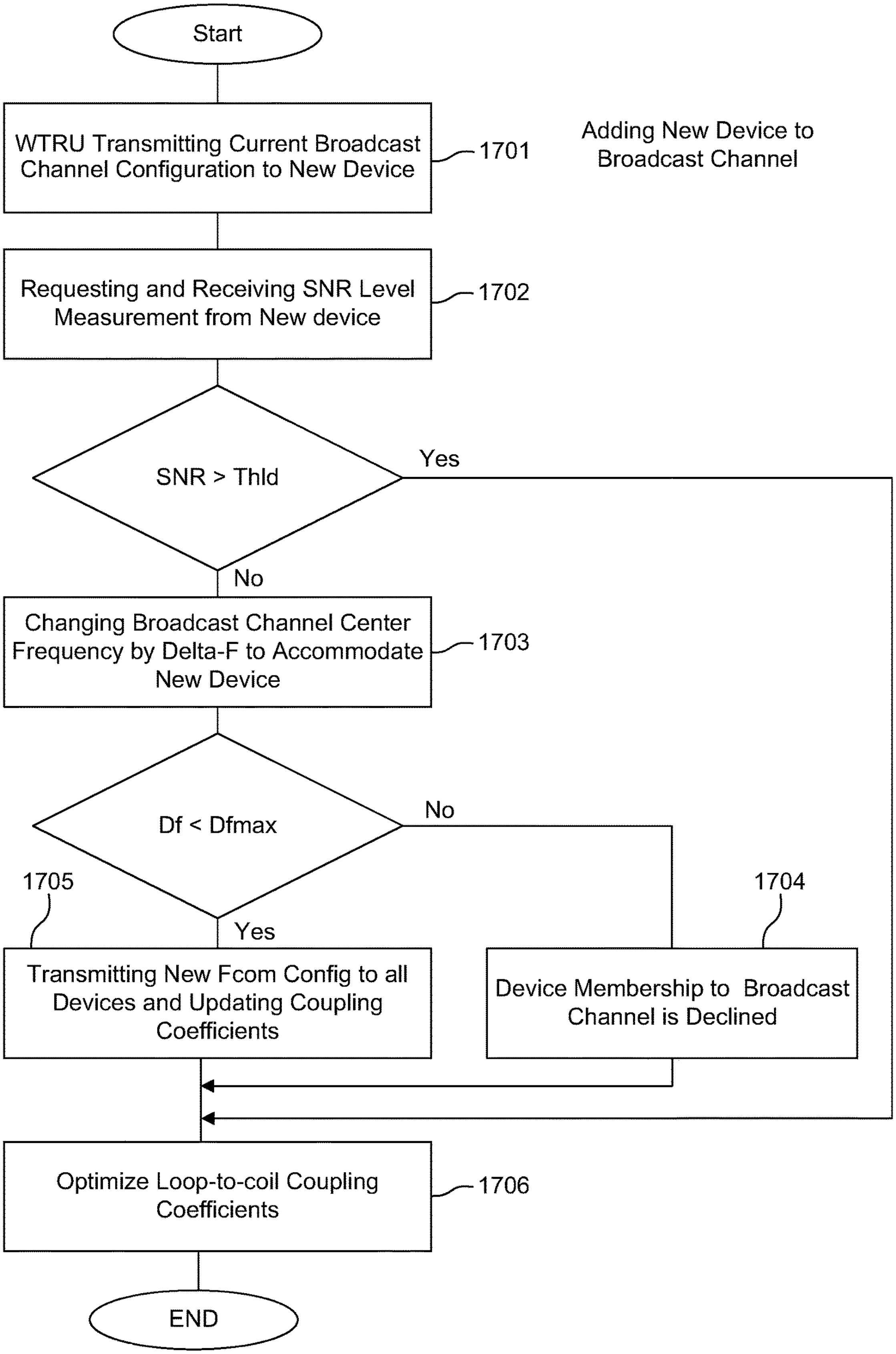
FIG. 17 is a flow chart illustrating an example of adding a new device to a broadcast group.

FIG. 17 shows a flow chart 1700 illustrating an example procedure of adding a new device to a broadcast group. In the example of FIG. 17, the WTRU may, at 1701, transmit a current Broadcast Channel configuration to a new device. The WTRU may, at 1702, request and receive an indication of a SNR level measurement from the new device. If the SNR level measurement or indicated value is not above a threshold, the WTRU may, at 1703, change a broadcast channel center frequency (fc) by a predetermined frequency increment (df), and if fc is less than a maximum deviation (fmax) from the original fc, the WTRU transmits, at 1705, the new Fcom Configuration to all devices and updates loop-to-coil coupling coefficients, otherwise, if fc is not less than fmax, the device, at 1704, is declined membership to the broadcast channel. The WTRU may, at 1706, optimize loop-to-coil coupling coefficients.

In some implementations, the WTRU may receive a request from a new device to participate in an existing RMC multicast. The WTRU may transmit the current Broadcast channel configuration to the new device appearing within range. The cluster head may request and receive an SNR level measurement from new device. If the SNR level is above a predetermined threshold, the WTRU may update the current broadcast channel members loop-to-coil coefficient to maintain a minimum SNR level or prevent a degradation of link quality. If the SNR level is below the predetermined threshold, the WTRU may change the broadcast channel center frequency, e.g., by df, for a new center frequency fc smaller than fmax. If, instead, the new center frequency required above is larger than some fmax, the new membership to the Broadcast Channel may be declined. The cluster head may transmit the Broadcast Channel updated configuration to the broadcast group members.

Some implementations relate to procedures where a device leaves the group. For example, in some implementations, a device announces its departure from the group or otherwise sends an indication of an intention to exit the group. Such announcements/indications may be received by the cluster head and other devices in the group. This may be referred to as a graceful exit. In some implementations, such device may be leaving the area due to mobility, disconnecting from cluster after completing an energy harvesting session, or entering a power saving mode, for example.

In some implementations, the device announces its graceful exit and, in some implementations, a reason for leaving the current cluster. In some implementations, the cluster head updates membership list based on the announcement and initiates procedures to assess performance impact and to re-optimize cluster settings, e.g., collaboration with exiting device.

In some implementations, the cluster head removes exiting device from the membership list. In some implementations, the cluster head measures an impact (e.g., SNR) to devices on Broadcast channel by requesting setting changes from exiting device. In some implementations, the cluster head may request a new set of SNR measurements over the Broadcast channel from remaining cluster members. In some implementations, the cluster head may, if reported SNR levels are below a threshold, request a new set of SNR contour measurements from affected devices. In some implementations, the cluster head may adjust the broadcast channel center frequency to accommodate new common channel. In some implementations, the cluster head may request changes (e.g., minor changes) of loop-to-coil coupling from devices. In some implementations, the cluster head may confirm an improvement in SNR level for all devices on BCH. In some implementations, if there is no improvement in SNR, no changes are implemented. Otherwise, in some implementations, the cluster head sends an ACK to the departing device to complete disconnect procedure.

In some implementations, there may be an opportunity to not just maintain or restore link quality over the BCH, but also to improve overall coverage or SNR for some (e.g., most) devices. For example, if the exiting device was an outlier, (e.g., skewing or stretching the BCH response in a particular direction), the cluster head may tighten or narrow the channel response based on the departure. In some implementations, this may have the advantage of improving link quality for all users.

In some implementations, a device leaves the group without announcing its departure from the group. This may be referred to as a sudden exit. In some implementations, a device may suddenly exit the group as a result of its link quality falling below a threshold for an extended period, due to an abrupt departure from the cluster coverage area, or due to a power-down, for example.

In some implementations, a cluster head determines a sudden exit by detecting a sudden change in signal quality, BCH quality and/or detecting a SNR below a threshold, or by determining that it is not getting a response from the exiting device within a scheduled time period, for example. In some implementations, in response to the sudden exit, the cluster head initiates procedures to re-optimize cluster settings.

Some such procedures include one or more of: removing the missing device from the membership list. Assessing impact on remaining devices by requesting a set of SNR measurements or other signal quality indications on the broadcast channel, adjusting the broadcast channel center frequency, requesting a change of loop-to-coil coupling from cluster devices, and confirming improvement in SNR level for all devices on BCH.

In some implementations, with the sudden exit, there may also be an opportunity to not just maintain or restore link quality over the BCH, but also to improve overall coverage or SNR for some (e.g., most) devices. For example, just as in the graceful departure case described earlier, if the exiting device was an outlier, (e.g., skewing or stretching the BCH response in a particular direction), the cluster head may tighten or narrow the channel response based on the departure. In some implementations, this may have the advantage of improving link quality for all users.

Figure 18A:
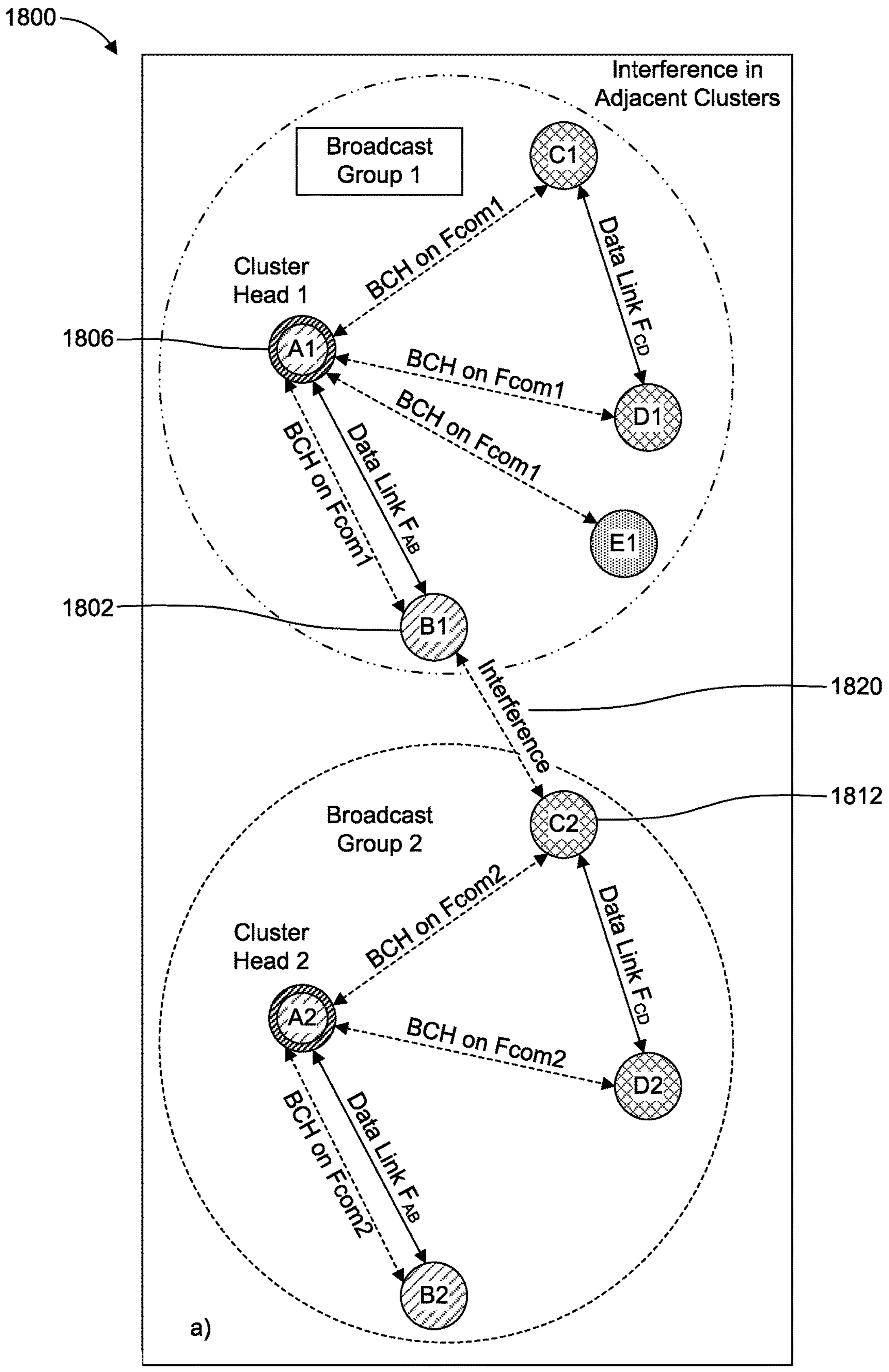
FIG. 18A illustrates an intercluster interference management scenario.
Figure 18A:
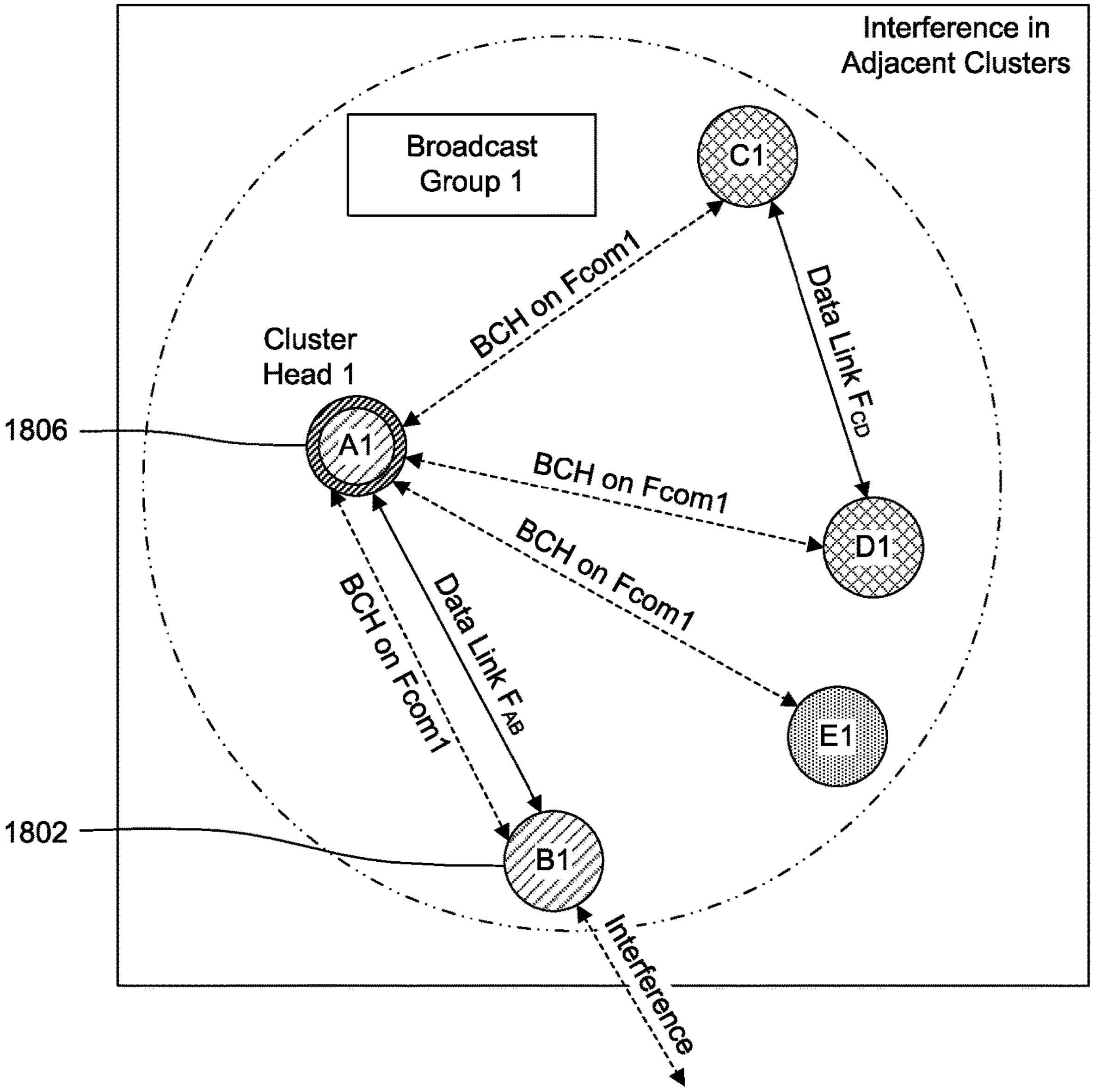
Figure 18A:
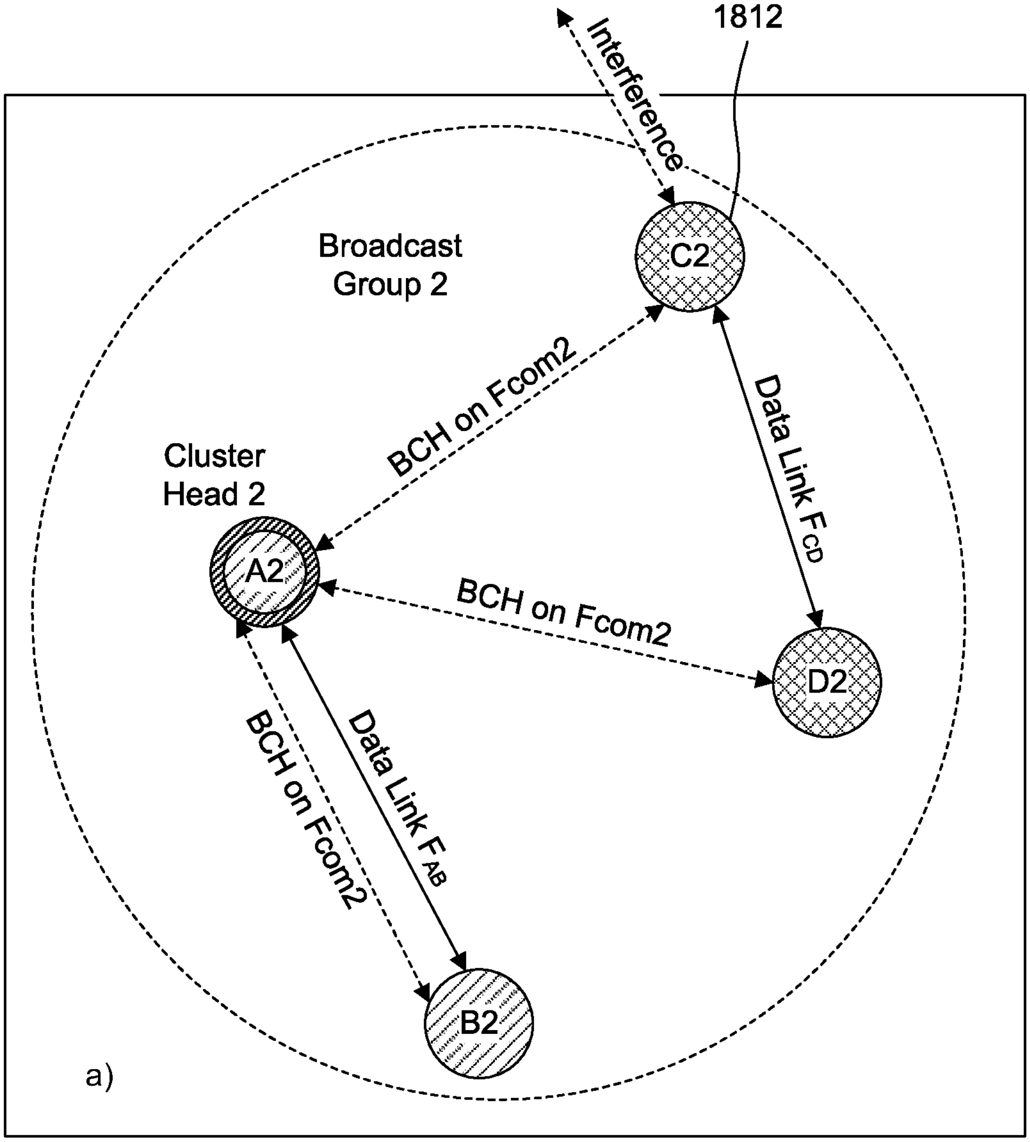
Figure 18B:
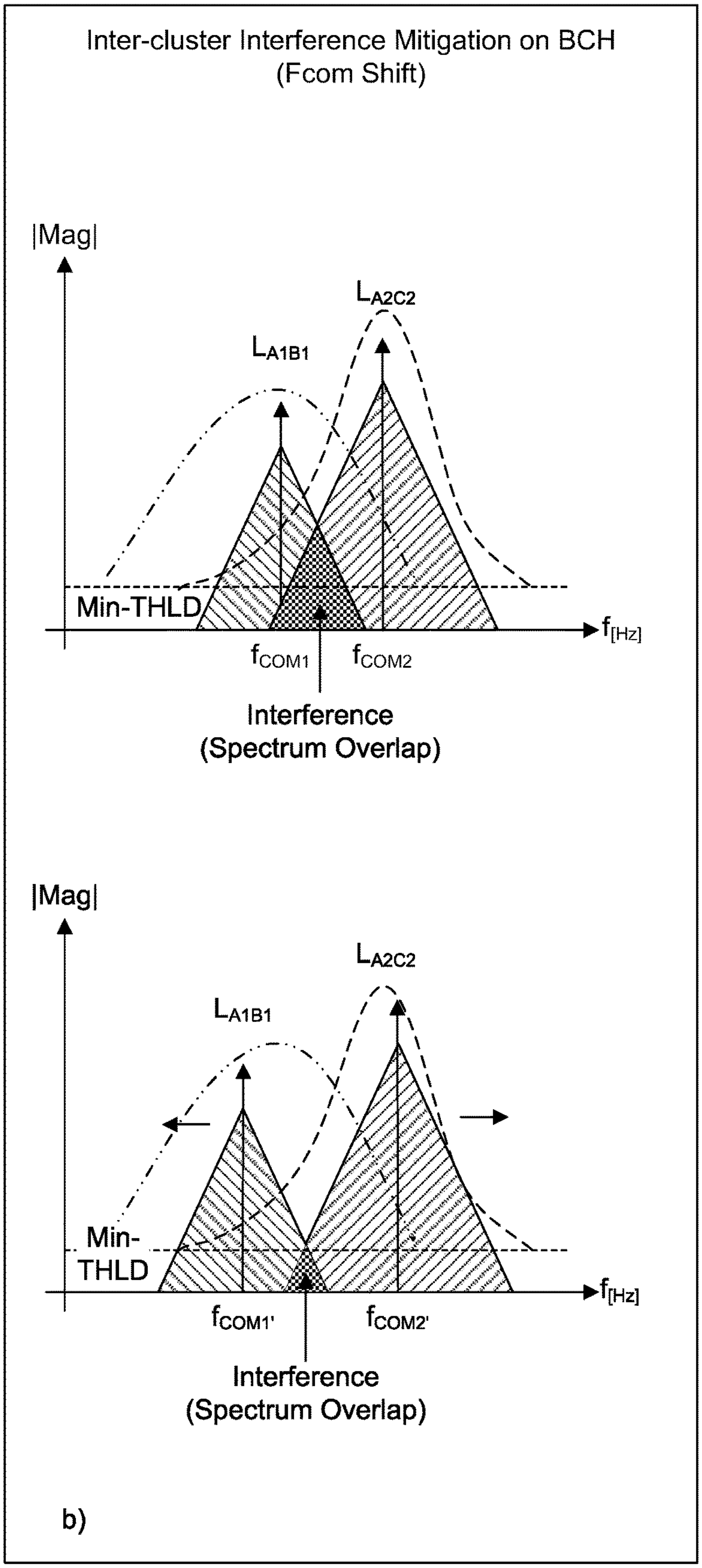
FIG. 18B illustrates an intercluster interference management scenario.
Figure 18B:
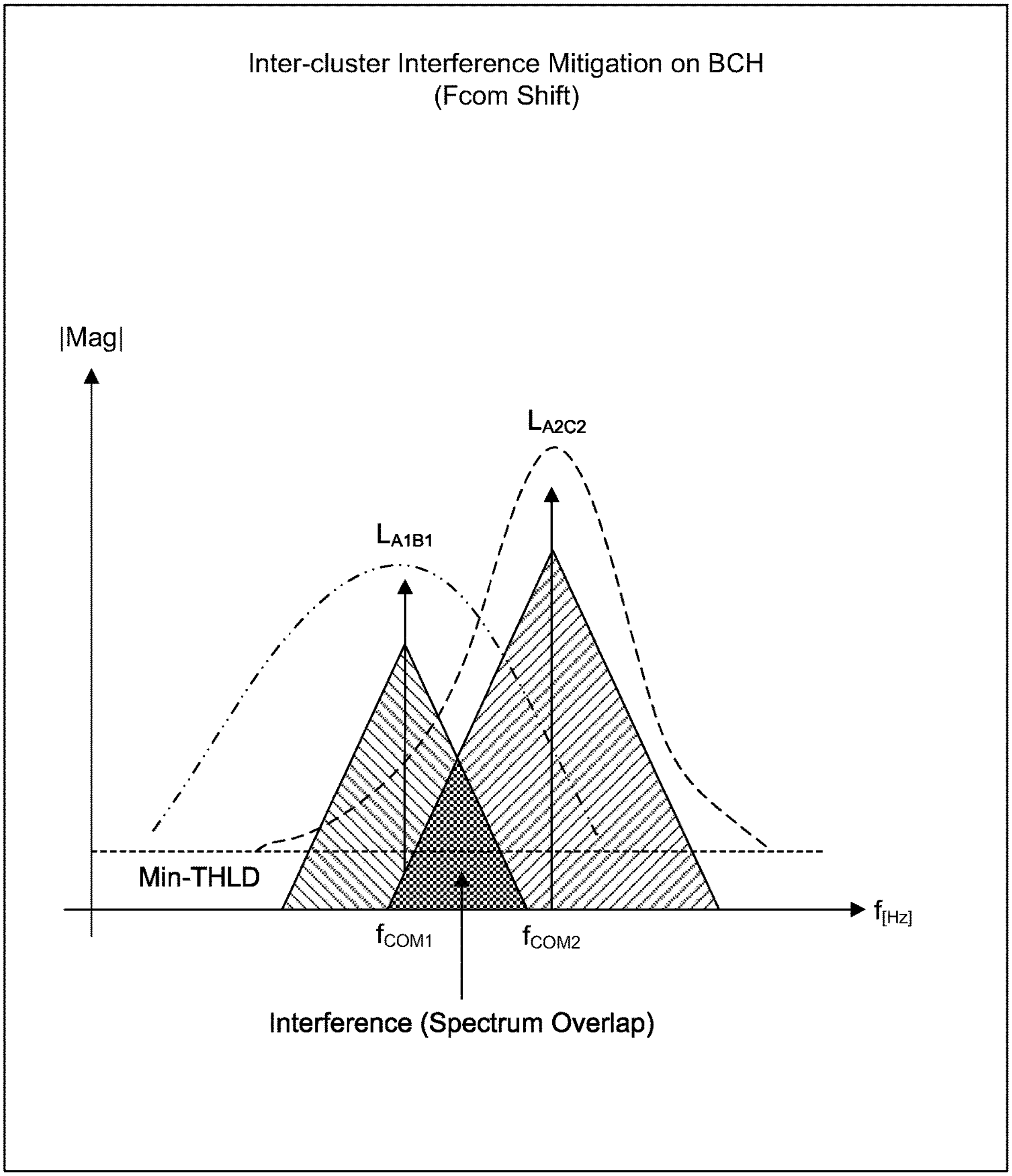
Figure 18B:
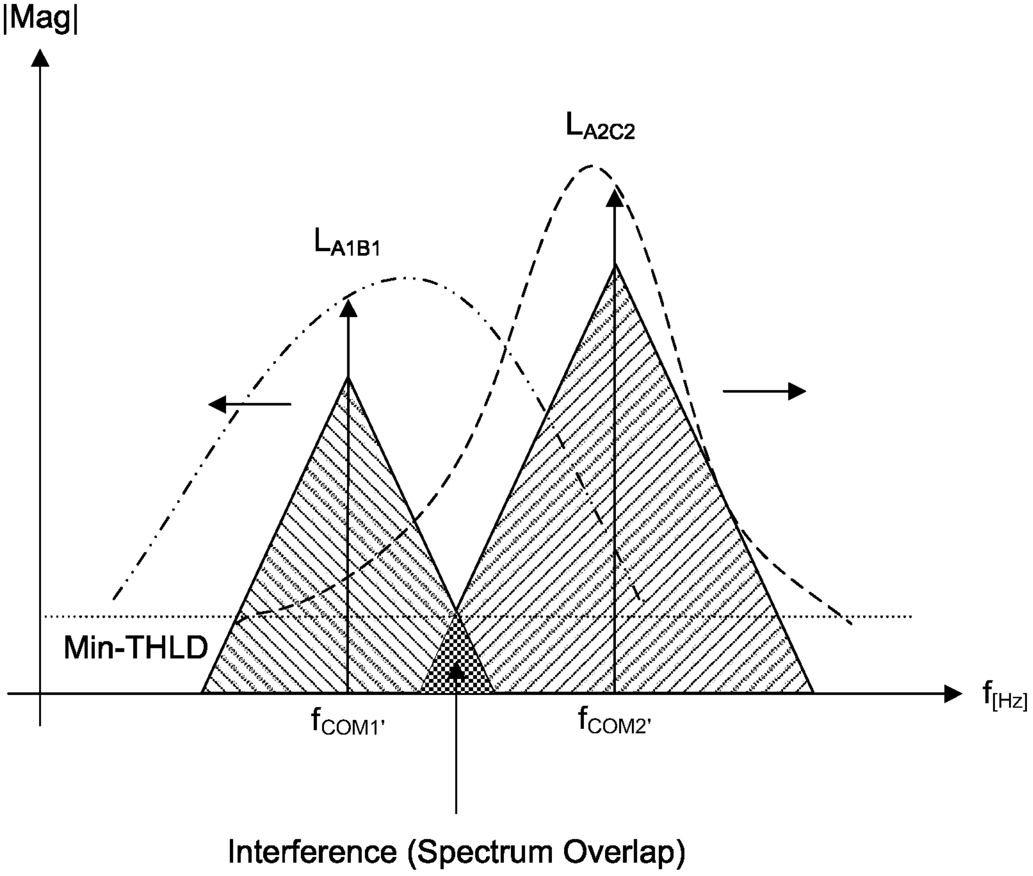
Figure 18C:
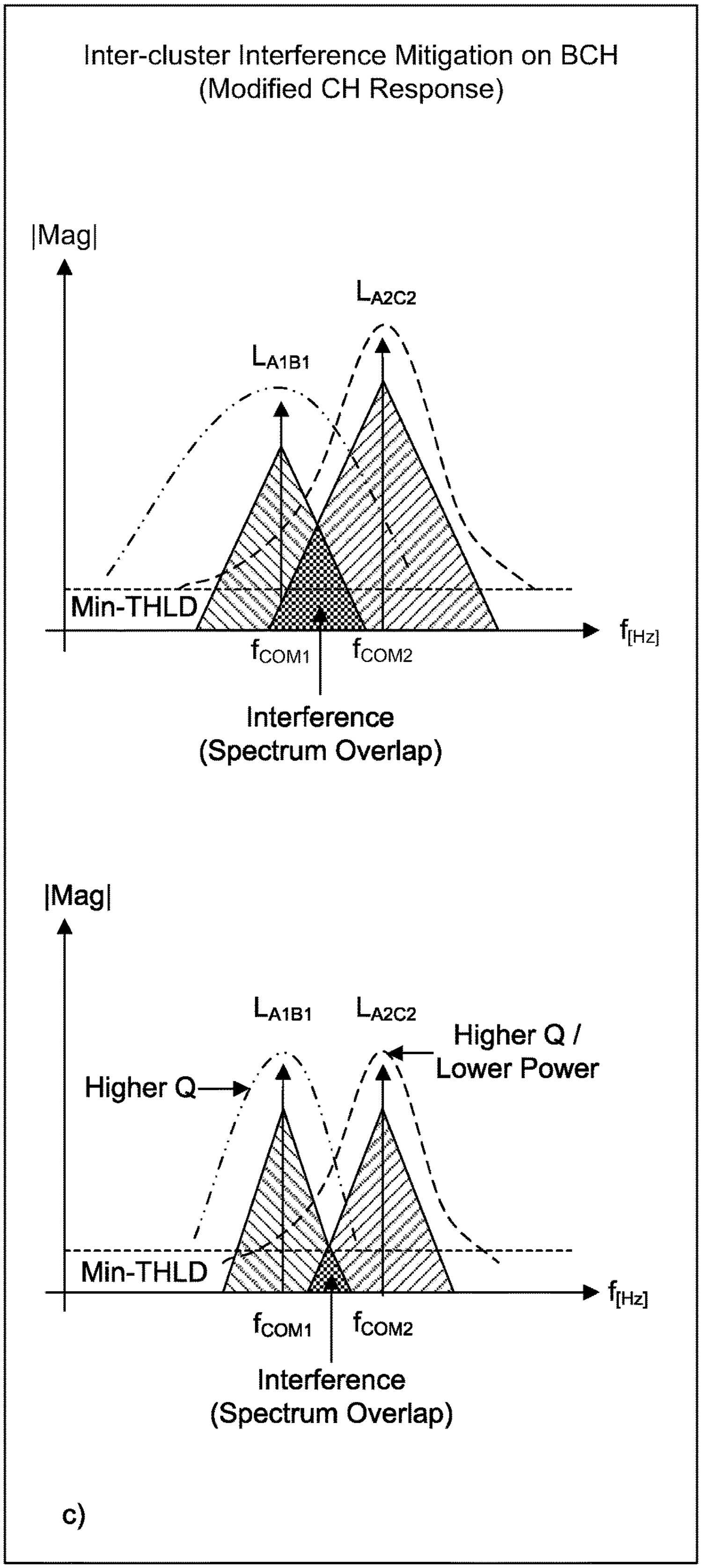
FIG. 18C illustrates an intercluster interference management scenario.
Figure 18C:
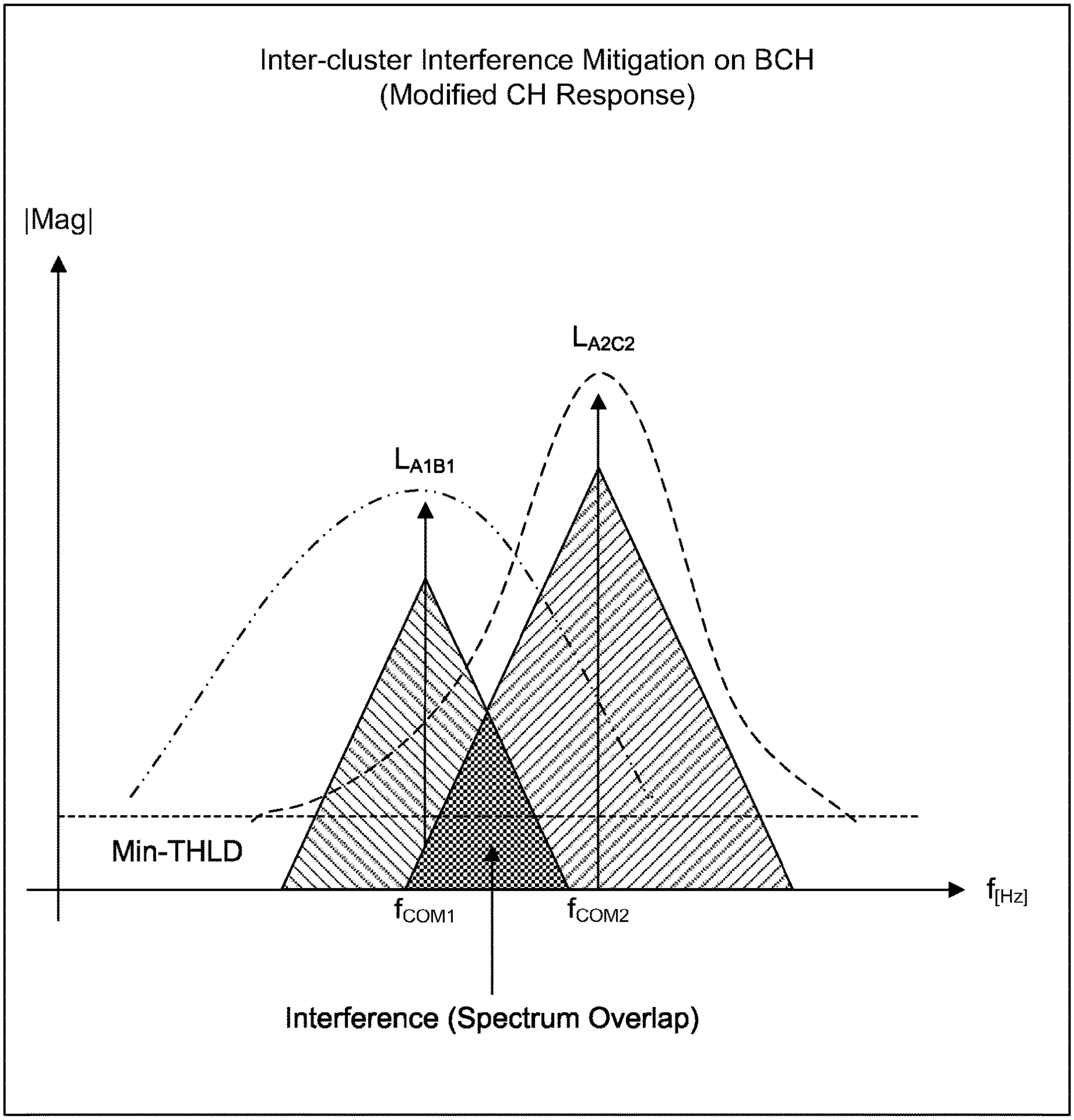
Figure 18C:
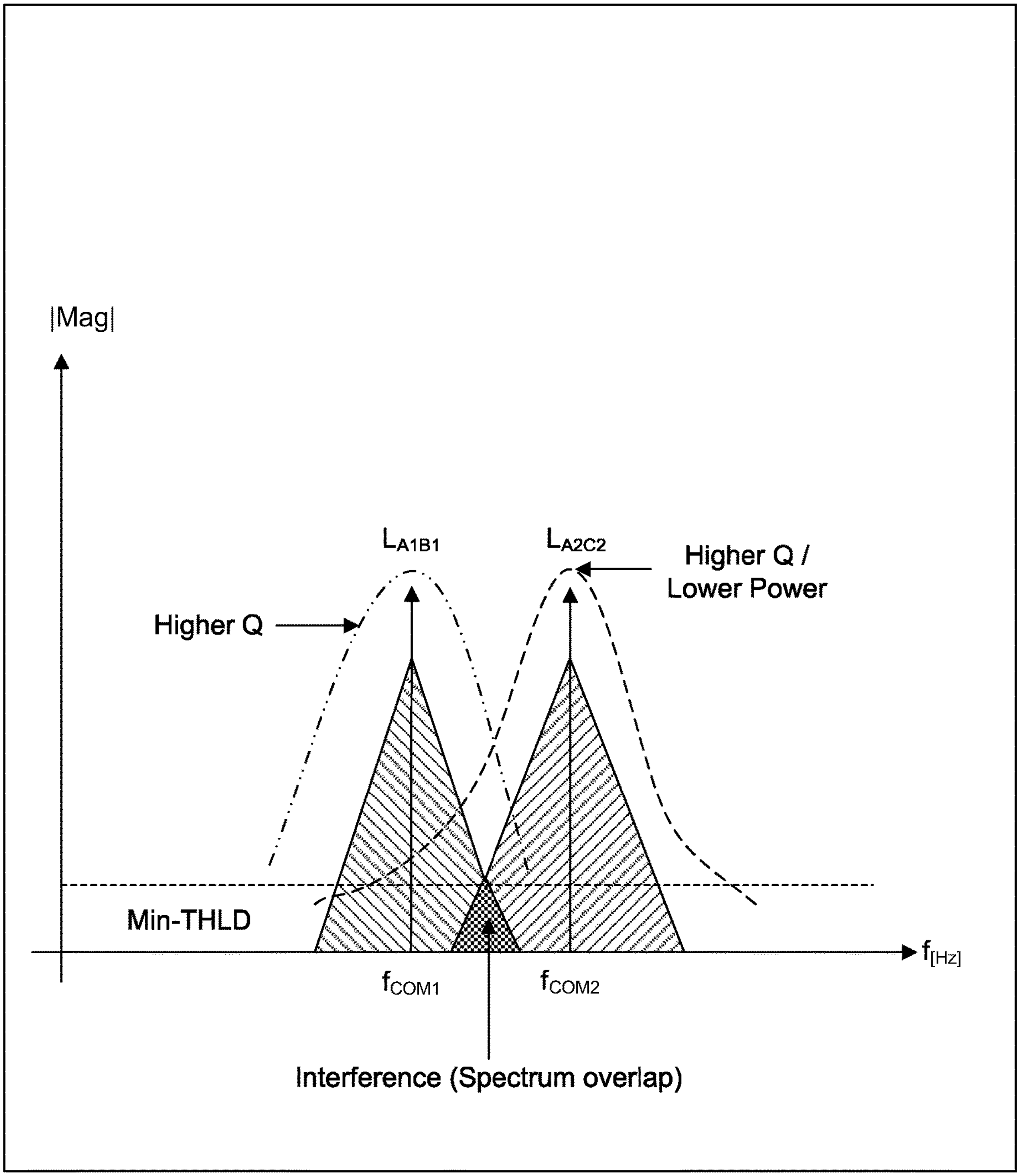

Some implementations relate to intercluster interference management. For example, members of adjacent clusters may exchange configuration information and collaborate to reduce or prevent intercluster interference. FIGS. 18A, 18B, and 18C illustrate an intercluster interference management scenario 1800. FIGS. 18AA and 18AB are enlargements of aspects of FIG. 18A. FIGS. 18BA and 18BB are enlargements of aspects of FIG. 18B. FIGS. 18CA and 18CB are enlargements of aspects of FIG. 18C.

In some implementations, a WTRU may exchange a groupcast configuration with a nearby (e.g., within a threshold distance) device belonging to an adjacent group and may report that new group's configuration to its local cluster head. In some implementations, a WTRU 1802 determines the presence of transmitting device 1812, e.g., belonging to an adjacent groupcast, by detecting interference 1820 (e.g., strong interference, above a threshold, etc.). For example, in some implementations, the WTRU 1802 determines the presence of a transmitting device 1812 belonging to an adjacent groupcast by detecting a sudden and/or repeating (e.g., periodic) increase in its received noise level. In some implementations, the WTRU 1802 determines an initial frequency range estimate for a discovery procedure based on the interference level (e.g., used as a function of distance and frequency separation). In some implementations, the WTRU 1802 initiates a discovery procedure, e.g., on a subset of channels in the vicinity of its broadcast frequency, to contact the interfering device. If interfering device is part of a unicast link, the WTRU 1802 may send a request instructing the device 1812 to move its communication to a different unicast channel. If interfering device is part of a broadcast group, the WTRU may request and exchange respective broadcast channel configuration information with found device. In some implementations, the WTRU reports newly discovered adjacent cluster configuration to its cluster head on its original Broadcast Channel. In some implementations, the interfering WTRU 1802 reports the cluster configuration of the initiating device to its cluster head 1806 (e.g., on a broadcast channel). In some implementations the respective cluster heads adjust their respective Broadcast Channel configurations based on the newly received information to provide more frequency separation between Broadcast channel center frequencies. In some implementations, this has the advantage of minimizing intercluster interference and/or improving overall SINR.

In some implementations, a device aware of the presence of an adjacent groupcast or nearby cluster uses that information to facilitate its transition to the adjacent or nearby cluster. For example, in some implementations, a mobile WTRU leaving its current cluster may use a previously reported adjacent cluster configuration to join the broadcast channel of a new group that comes into range. In some implementations, the WTRU moving away from its existing cluster measures the SNR level of current cluster members on BCH to determine its proximity to other devices. In some implementations, the WTRU uses the SNR measurements to determine which adjacent cluster is likely to be in range. In some implementations, the WTRU uses a BCH reported by a device with a high SNR to determine the BCH configuration of a cluster coming into range. In some implementations, the mobile WTRU loses connection with its current cluster and transmits a request to join the determined adjacent cluster on the reported BCH.

Figure 19A:
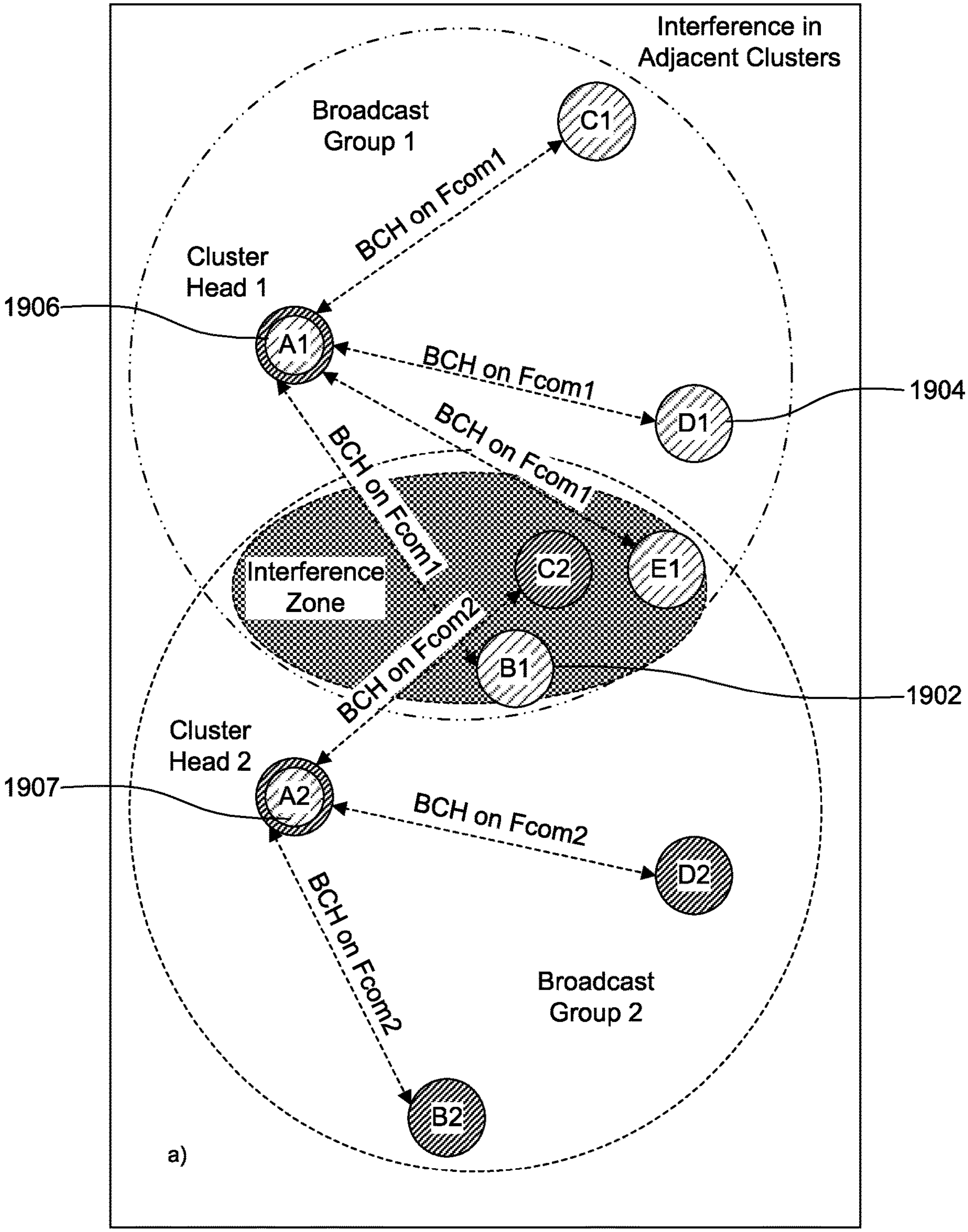
FIG. 19A illustrates an example scenario where adjacent clusters experience intercluster interference.
Figure 19B:
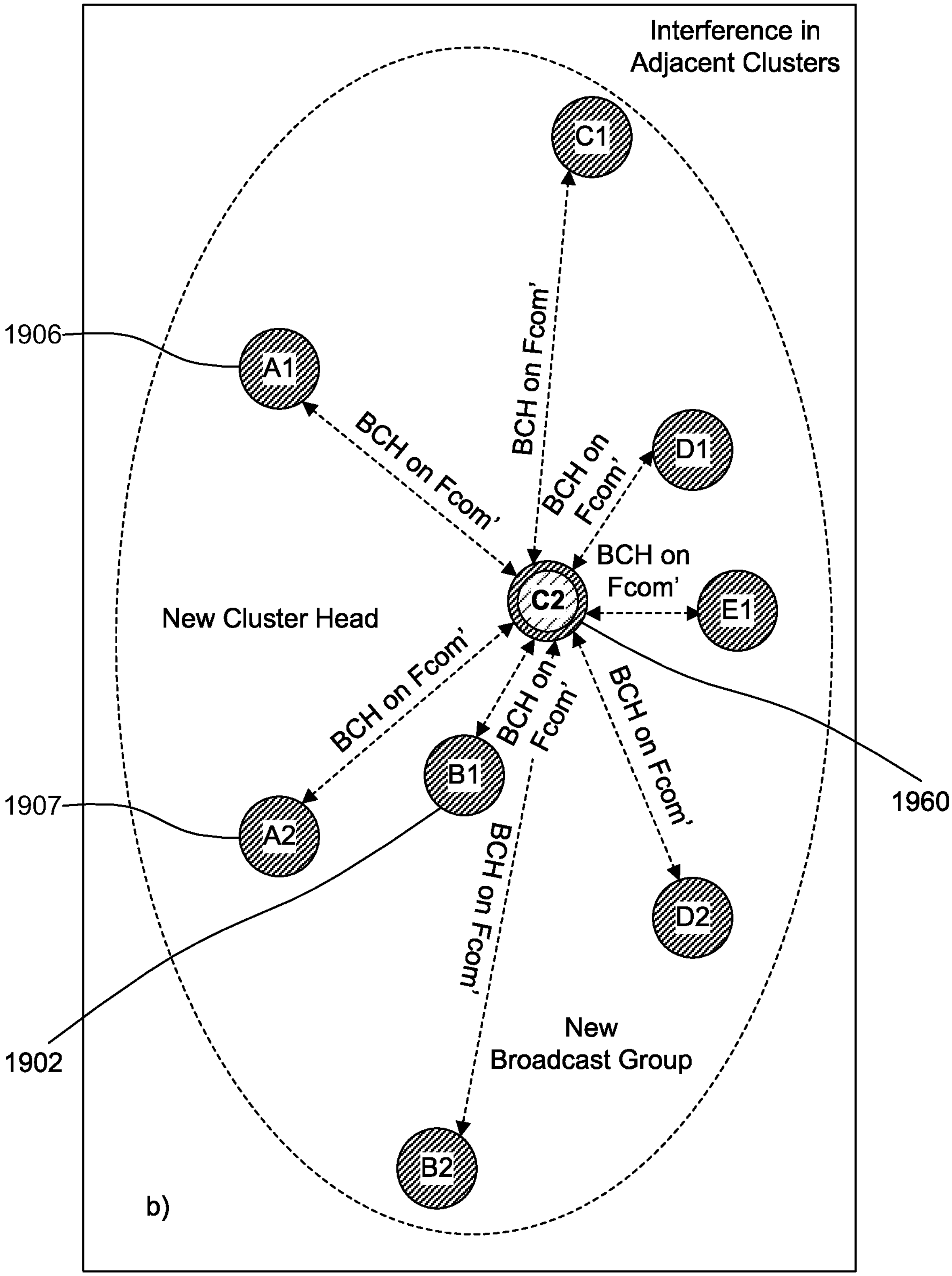
FIG. 19B illustrates an example scenario where adjacent clusters experience intercluster interference.

Some implementations relate to joining clusters (e.g., merging clusters to create a super-cluster). FIGS. 19A-19B illustrate an example scenario where adjacent clusters experiencing intercluster interference, or small clusters with reduced membership, may merge to form a super-cluster operating on a single BCH. In some implementations, adjacent clusters within range are able to communicate on a common channel to merge and form a single cluster, which may result in reduced intercluster interference.

For example, if a WTRU 1902 experiences interference from a device belonging to an adjacent cluster, the WTRU 1902 may initiate an intercluster interference management procedure and may relay adjacent cluster configuration to its cluster head 1906 (e.g., as discussed herein). The cluster head 1906, based on the reported information, may propose a merge to the adjacent cluster head 1907. If the merge proposal is accepted, a new cluster head selection procedure may be initiated. In some implementations, a device that is most "centrally" (e.g., relatively or within a threshold amount of centrality) located, e.g., in frequency and space and/or able to reach most, or all, devices within the new super-cluster, is selected as the new cluster head 1960 for the merged cluster. The new cluster head 1960 requests SNR and/or SNR contours from all devices and uses the received SNR and/or SNR contours to determine a Broadcast Channel for the super-cluster.

In some implementations, a small cluster or cluster experiencing reduced membership may elect to join an adjacent group (e.g., within a given range) for more efficient resource allocation. For example, if a WTRU 1904 detects the presence of a device belonging to an adjacent group, the WTRU may exchange cluster configuration information with the detected device and may report the information to its cluster head 1906. The cluster head 1906 may determine the feasibility of a merge based on the reported information (e.g., frequency separation between Broadcast channels, member count, and/or reported SNR levels). If it determines that a merge is feasible, the cluster head 1906 may request a merge through a WTRU in contact with the adjacent cluster. If the merge proposal is accepted, a new cluster head selection procedure may be initiated. In some implementations, a device that is most "centrally" (e.g., relatively or within a threshold amount of centrality) located, e.g., in frequency and space and/or able to reach most, or all, devices within the new super-cluster, is selected as the new cluster head 1960 for the merged cluster. The new cluster head 1960 requests SNR and/or SNR contours from all devices and uses the received SNR and/or SNR contours to determine a Broadcast Channel for the super-cluster.

Figure 20A:
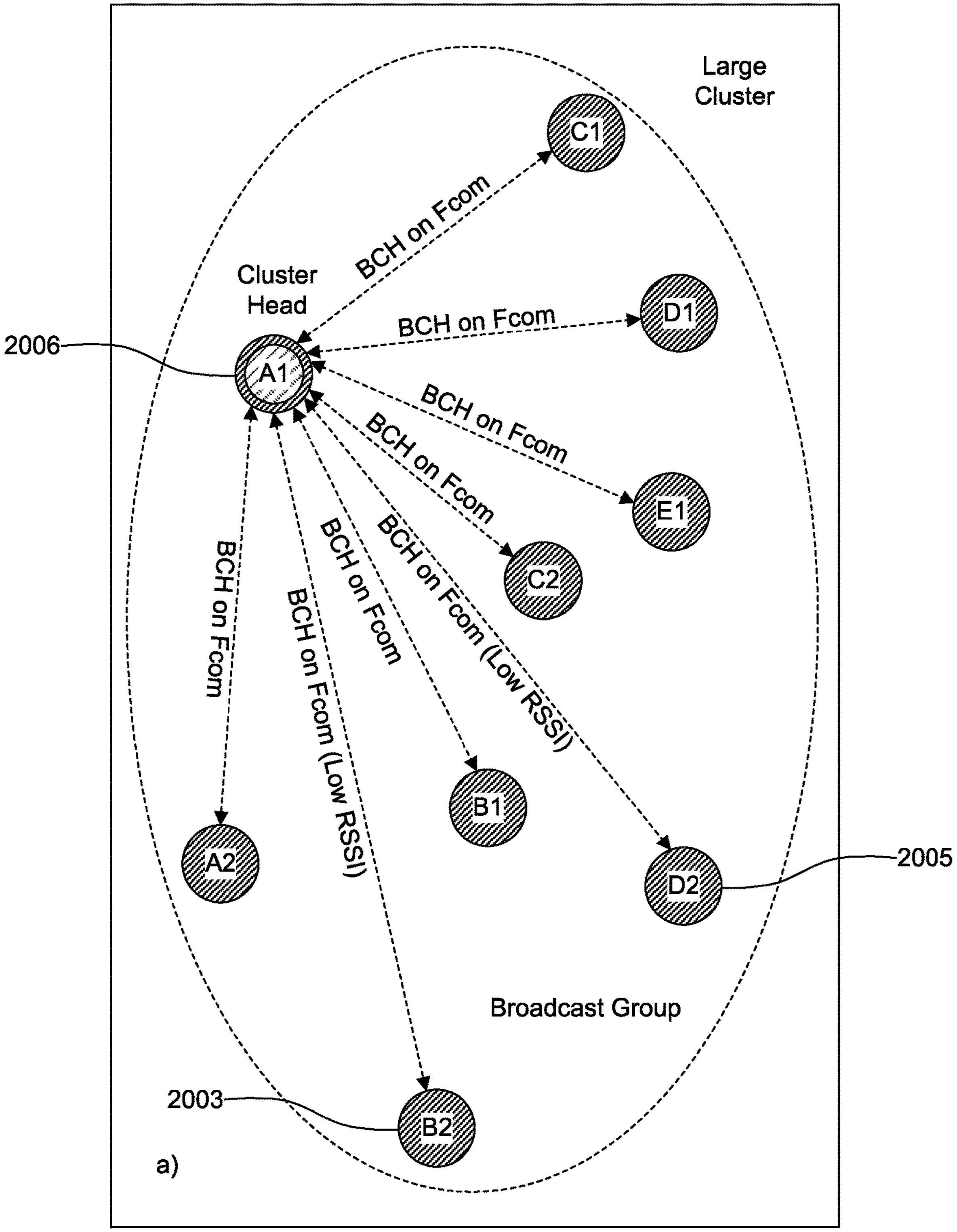
FIG. 20A illustrates an example cluster including unicast links having reduced quality.
Figure 20B:
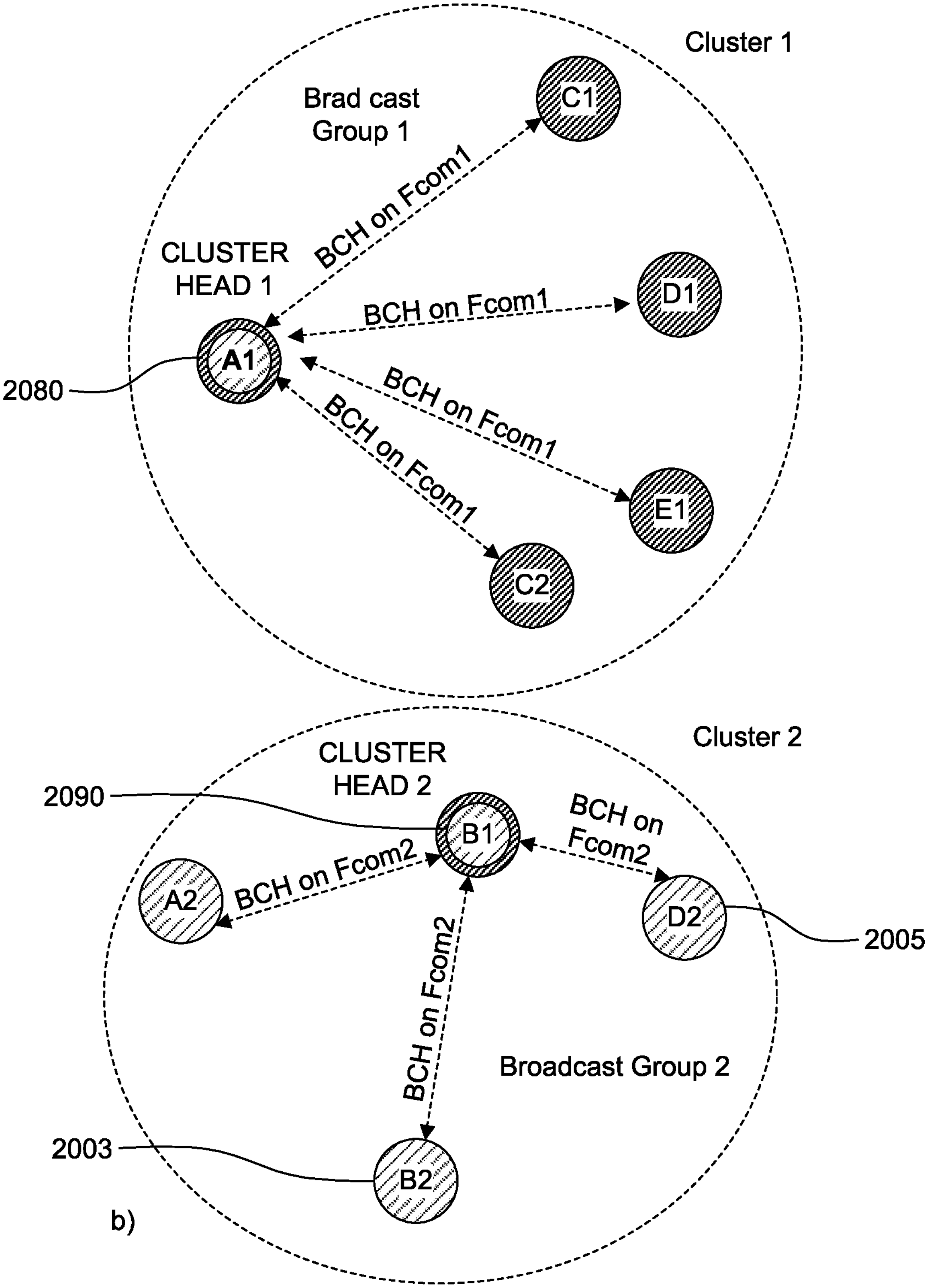
FIG. 20B illustrates two example clusters formed from the example cluster of FIG. 20A in response to the unicast links having reduced quality.

Some implementations relate to breaking-up clusters into smaller groups. For example, over time, e.g., due to changes in device location, orientation and/or other cluster dynamics, it may be desirable to divide a cluster into smaller groups, e.g., to improve communication over the Broadcast Channel. This may be indicated, for example, where the cluster head observes a drop in signal or link quality for a subset of devices on the channel. This may be an indication of a shift in the coverage area, not just a lone device moving out of range. This scenario is illustrated in FIGS. 20A and 20B.

In some implementations, if a cluster head 2006 is no longer able to communicate with every device such as WTRU B2 2003 or WTRU D2 2005 on BCH, a new cluster head selection procedure is initiated to find a device able to communicate with all cluster members. If the new cluster head selection procedure is unsuccessful, a cluster partitioning procedure may be initiated. Two or more new cluster heads 2080, 2090 may be selected, e.g., based on their ability to communicate with a subset of devices within range. Two or more Broadcast channels may be induced after SNR contours have been reported to the new cluster heads.

In some implementations, one or more member devices may not be able to communicate with other cluster members. For example, a WTRU may be able to communicate with some devices but not with the cluster head. In some implementations, such WTRU may detect an adjacent cluster device. In some implementations, such WTRU, e.g., along with subset of devices from its current cluster, may request to join the adjacent cluster Broadcast channel (i.e., including the adjacent cluster device).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU) in a resonance magnetic coupled communication system, the method comprising:

receiving, from each of a plurality of devices, a message including a request to receive transmissions over a broadcast channel;

transmitting a reference signal to the plurality of devices;

transmitting, to the plurality of devices, a message requesting signal measurements of the transmitted reference signal;

receiving, from each of the plurality of devices, signal measurement reports including the requested signal measurements of the transmitted reference signal, wherein the requested signal measurements are associated with corresponding device-specific frequency ranges;

transmitting, to each of at least a subset of the plurality of devices, a message requesting adjustment, by each of the at least the subset of the plurality of devices, of a parameter to improve a signal quality indicated by a signal measurement received from each of the at least the subset of the plurality of devices;

receiving, from each of the at least the subset of the plurality of devices, signal measurement reports including new signal measurements associated with corresponding device-specific frequency ranges;

transmitting a configuration message to the plurality of devices, the configuration message indicating a broadcast channel frequency and bandwidth, wherein the broadcast channel frequency and bandwidth are at least in part based on the new signal measurements and the corresponding device-specific frequency ranges of the at least the subset of the plurality of devices; and sending a transmission using the indicated broadcast channel frequency and bandwidth.

2. The method of claim 1, wherein the parameter is a loop-to-coil coefficient, and wherein the loop-to-coil coefficient modifies an efficiency or range of the resonance magnetic coupled communication system.

3. The method of claim 1, wherein the indicated signal quality is a received signal strength indication (RSSI) value.

4. The method of claim 1, wherein the indicated signal quality is a signal-to-noise ratio (SNR) value.

5. The method of claim 1, wherein the message requesting signal measurements of the transmitted reference signal is a request for signal measurements associated with the device-specific frequency ranges.

6. The method of claim 1, wherein the configuration message includes an indication of a cluster membership status of each of the plurality of devices, and wherein the cluster membership status is determined based on the received signal measurement reports including signal measurements.

7. The method of claim 1, wherein the broadcast channel frequency is located within a median frequency range of the device-specific frequency ranges.

8. The method of claim 1, wherein the broadcast channel frequency is overlapped by at least a subset of the device-specific frequency ranges.

9. A wireless transmit/receive unit (WTRU) configured to communicate via a resonance magnetic communication link, the WTRU comprising:

- an antenna having a loop coupled to a multi-turn spiral coil; and
- a processor and a transceiver communicatively coupled to the antenna and configured to:
  - receive, from each of a plurality of devices, a message including a request to receive transmissions over a broadcast channel;
  - transmit a reference signal to the plurality of devices;
  - transmit, to the plurality of devices, a message requesting signal measurements of the transmitted reference signal;
  - receive, from each of the plurality of devices, signal measurement reports including the requested signal measurements of the transmitted reference signal, wherein the requested signal measurements are associated with corresponding device-specific frequency ranges;
  - transmit, to each of at least a subset of the plurality of devices, a message requesting adjustment, by each of the at least the subset of the plurality of devices, of a parameter to improve a signal quality indicated by a signal measurement received from each of the at least the subset of the plurality of devices;
  - receive, from each of the at least the subset of the plurality of devices, signal measurement reports including new signal measurements associated with corresponding device-specific frequency ranges;
  - transmit a configuration message to the plurality of devices, the configuration message indicating a broadcast channel frequency and bandwidth, wherein the broadcast channel frequency and bandwidth are at least in part based on the new signal measurements and the corresponding device-specific frequency ranges of the at least the subset of the plurality of devices; and
  - send a transmission using the indicated broadcast channel frequency and bandwidth.

10. The WTRU of claim 9, wherein the parameter is a loop-to-coil coefficient, and wherein the loop-to-coil coefficient modifies an efficiency or range of the resonance magnetic coupled communication system.

11. The WTRU of claim 9, wherein the indicated signal quality is a received signal strength indication (RSSI) value.

12. The WTRU of claim 9, wherein the indicated signal quality is a signal-to-noise ratio (SNR) value.

13. The WTRU of claim 9, wherein the message requesting signal measurements of the transmitted reference signal is a request for signal measurements associated with the device-specific frequency ranges.

14. The WTRU of claim 9, wherein the configuration message includes an indication of a cluster membership status of each of the plurality of devices, and wherein the cluster membership status is determined based on the received signal measurement reports including signal measurements.

15. The WTRU of claim 9, wherein the broadcast channel frequency is located within a median frequency range of the device-specific frequency ranges.

16. The WTRU of claim 9, wherein the broadcast channel frequency is overlapped by at least a subset of the device-specific frequency ranges.

17. A wireless transmit/receive unit (WTRU) configured to communicate via a resonance magnetic communication link, the WTRU comprising:

- an antenna having a loop coupled to a multi-turn spiral coil; and
- a processor and a transceiver communicatively coupled to the antenna and configured to:
  - transmit, to another WTRU, a message including a request to send transmissions over a broadcast channel;
  - receive a reference signal from the other WTRU;
  - receive, from the other WTRU, a message requesting signal measurements of the received reference signal;
  - transmit, to the other WTRU, a signal measurement report including the requested signal measurement of the received reference signal, wherein the requested signal measurement is associated with a device-specific frequency range;
  - receive, from the other WTRU, a message requesting adjustment of a parameter to improve a signal quality indicated by the signal measurement;
  - transmit, to the other WTRU, a signal measurement report including a new signal measurement associated with the device-specific frequency range; receive a configuration message from the other WTRU, the configuration message indicating a broadcast channel frequency and bandwidth, wherein the broadcast channel frequency and bandwidth are at least in part based on the new signal measurement and the device-specific frequency range; and
  - receive a transmission using the indicated broadcast channel frequency and bandwidth.

18. The WTRU of claim 17, wherein the parameter is a loop-to-coil coefficient, and wherein the loop-to-coil coefficient modifies an efficiency or range of the resonance magnetic coupled communication link.

19. The WTRU of claim 17, wherein the broadcast channel frequency is located within a median frequency range of the device-specific frequency ranges.

20. The WTRU of claim 17, wherein the broadcast channel frequency is overlapped by at least a subset of the device-specific frequency ranges.

* * * * *